(12) United States Patent
Miura

(10) Patent No.: US 8,693,015 B2
(45) Date of Patent: Apr. 8, 2014

(54) PRINTING CONTROL DEVICE, PRINTING APPARATUS, AND PRINTING CONTROL METHOD IN PRINTING APPARATUS CAPABLE OF REDUCING ERRORS CAUSED BY OUT-OF-SYNCHRONIZATION

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 357 days.

(21) Appl. No.: 13/185,721

(22) Filed: Jul. 19, 2011

(65) Prior Publication Data

US 2012/0026523 A1 Feb. 2, 2012

(30) Foreign Application Priority Data

Jul. 28, 2010 (JP) ................. 2010-169545

(51) Int. Cl.
*G06F 3/12* (2006.01)
*G06K 15/22* (2006.01)
*H04N 1/60* (2006.01)
*B41C 1/00* (2006.01)
*H04N 1/46* (2006.01)

(52) U.S. Cl.
USPC ........... 358/1.13; 358/1.4; 358/1.9; 358/3.32; 358/502

(58) Field of Classification Search
USPC ............. 358/1.13, 1.9, 3.02, 3.23, 3.32, 502; 347/1, 4, 5, 9, 12, 10, 24, 29, 32, 37, 347/40, 43, 50, 100, 101, 117, 138, 153, 347/166, 168, 181, 187, 211, 214, 218, 237, 347/247, 250, 110
See application file for complete search history.

(56) References Cited

U.S. PATENT DOCUMENTS

| | | | |
|---|---|---|---|
| 7,311,379 B2 | 12/2007 | Mitsuzawa | |
| 2004/0046830 A1* | 3/2004 | Mitsuzawa | ...................... 347/40 |
| 2004/0070637 A1* | 4/2004 | Kanematsu et al. | ............ 347/12 |
| 2009/0180133 A1* | 7/2009 | Yamamoto | .................... 358/1.13 |
| 2009/0231605 A1* | 9/2009 | Kuwahara | ...................... 358/1.9 |

FOREIGN PATENT DOCUMENTS

JP 2004-025551 A 1/2004

* cited by examiner

*Primary Examiner* — Ngon Nguyen
(74) *Attorney, Agent, or Firm* — Maschoff Brennan

(57) ABSTRACT

Commands, which are stored in a queue within controllers in order of acquisition, are transmitted to mechanical I/F units (steps (1) and (2) in FIG. 7). A determination portion in each mechanical I/F unit determines whether or not the command is an internal command (for example, an error command) which is generated in the controllers. If the command is the internal command, the command is directly output to the mechanical controller. In contrast, if the command is not the internal command, a virtual mechanical controller outputs the command through synchronization processing for confirming whether the commands issued from the controllers are synchronized (steps (3) to (7) in FIG. 7).

13 Claims, 8 Drawing Sheets

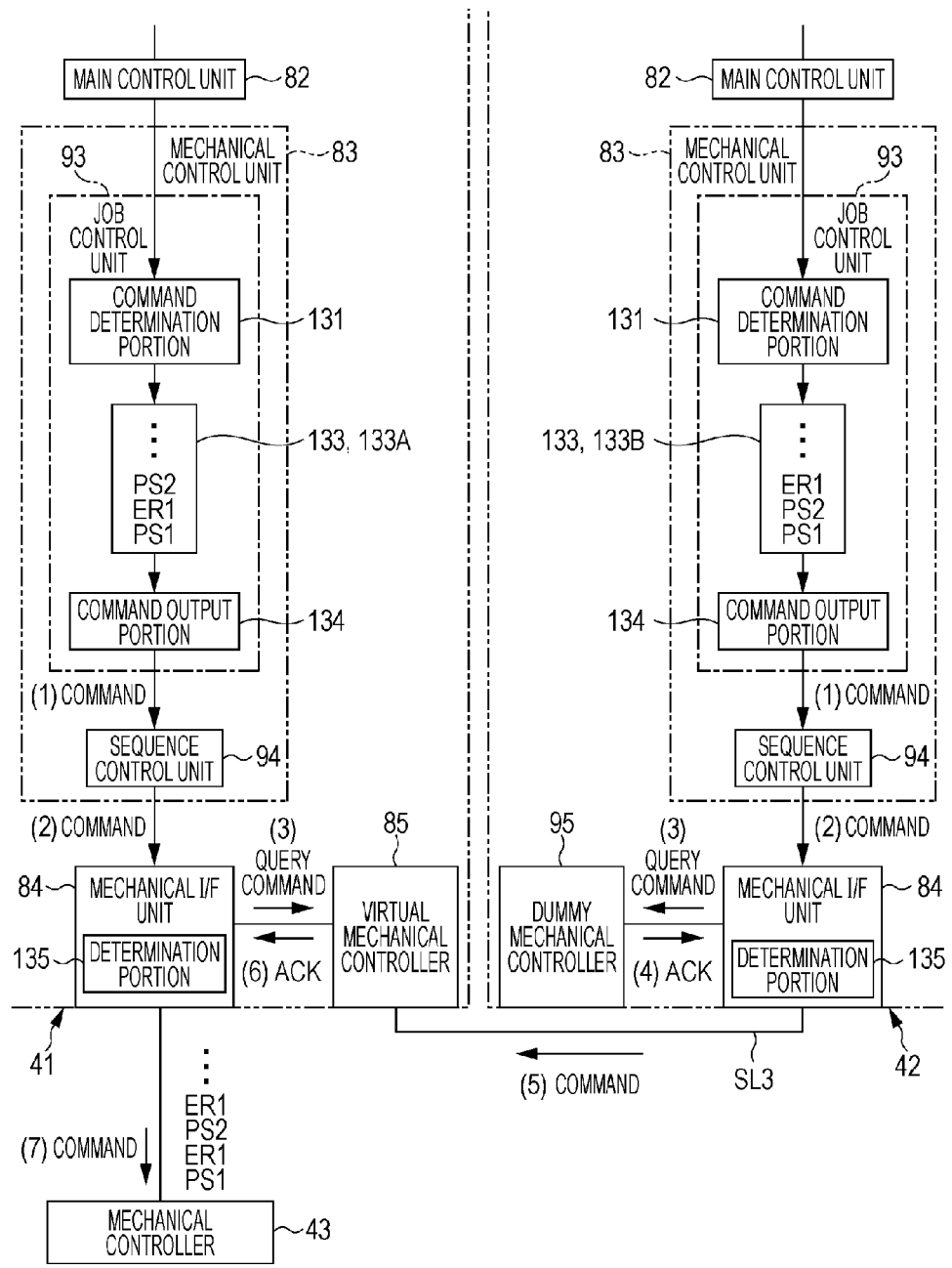

PRINTING CONTROL DEVICE, PRINTING APPARATUS, AND PRINTING CONTROL METHOD IN PRINTING APPARATUS CAPABLE OF REDUCING ERRORS CAUSED BY OUT-OF-SYNCHRONIZATION

This application claims priority to Japanese Patent Application No. 2010-169545, filed Jul. 28, 2010, the entirety of which is incorporated herein by reference.

BACKGROUND

1. Technical Field the invention relates to a printing control device, which controls the printing section in the printing apparatus, a printing apparatus, and a printing control method in the printing apparatus.

2. Related Art

For example, JP-A-2004-25551 discloses a printing apparatus which includes a plurality of recording heads (fluid ejecting sections) for ejecting ink. In the printing apparatus, a carriage, which is provided to be able to reciprocate, is equipped with: a plurality of printing heads; and a plurality of driving control sections that controls driving of the plurality of printing heads. Further, the main body of the printing apparatus is equipped with a plurality of data processing sections that transfers data to the respective driving control sections. The main control unit, which controls the reciprocation of the carriage, is connected to a plurality of circuit groups each of which is formed of one driving control section and one data processing section per a predetermined number of printing heads. In this configuration, processing is shared among circuits belonging to the single circuit group per the predetermined number of printing heads. Therefore, according to the printing apparatus, processing load per one data processing section is reduced.

Further, a large number of recording heads may be provided. In this case, two or more main control units are provided, and a printing control device, in which the main control units, the data processing section, and the driving control section are formed as a single circuit group, is constituted by a single substrate, and the printing apparatus is configured to include a plurality of the substrates. In such a configuration of the printing apparatus, the plurality of recording heads is shared and controlled by the plurality of printing control devices. Hence, as the number of recording heads increases, the number of printing control devices increases. In such a manner, while relatively reducing load per one printing control device, it is possible to secure a necessary printing process speed.

Further, the following configuration may be adopted: each printing control device, which is for controlling the plurality of recording heads, and the driving control device, which controls driving of the carriage and transport of the printing medium (the sheet), is separately formed; and each printing control device transmits the command, which is acquired from the print data, to the driving control device. In this case, it is necessary to synchronize the output timing of the commands, which are issued from the respective printing control devices to the driving control device, with each other. For example, one printing control device is set as a master (a master-side printing control device), and another printing control device is set as a slave (a slave-side printing control device). In addition, the master-side printing control device is configured to transmit commands to the driving control devices (a mechanical controller and the like) of a carriage system and a transport system when the command received from the slave-side printing control device is synchronized with its own command. With such a configuration, it is possible to appropriately control the timing for performing an ink ejecting process of each recording head controlled by another printing control device and the timing for performing the transport process of the printing medium controlled by the driving control device.

Further, not only the plurality of recording heads may be shared among the plurality of printing control devices, but also even a plurality of components such as a plurality of ink cartridges, which supplies ink to the recording heads, and a nozzle test device, which tests nozzle clogging of the recording heads, provided in the printing apparatus may be shared among and connected to the plurality of printing control devices, thereby sharing load among the respective printing control devices. Here, normally, the ink cartridge is provided with a storage element in which ink-related information on a remaining ink level, an ink color, and the like is stored, and each printing control device accesses the storage element of the associated ink cartridge, thereby sharing and managing the ink-related information on remaining ink levels of ink types.

However, in the plurality of printing control devices, in some cases, only a certain printing control device may individually generate a command (an internal command) from the inside thereof. Examples of the internal commands, which are generated inside the printing control device, include an ink running out error (an ink end error) of an ink cartridge associated with a printing control device, a nozzle clogging error of a nozzle test device, and errors in components such as an associated recording head, an ink cartridge, a nozzle test device, and the like.

As it is, for example, when an internal command is generated from the master-side printing control device, the internal command is not generated from another slave-side printing control device. For this reason, when the master-side printing control device outputs an internal command, although the master-side printing control device waits for the same internal command from the slave-side printing control device in order to perform synchronization, no command is received, and thus a timeout occurs in the synchronization processing. As a result, a problem arises in that it is difficult to output the internal command.

SUMMARY

An advantage of some aspects of the invention is to provide a printing control device, a printing apparatus, and a printing control method, used in the printing apparatus, capable of reducing errors which are caused by out-of-synchronization resulting from the commands to be output not being synchronized between a plurality of printing control devices.

In order to obtain the advantage, according to an aspect of the invention, there is provided a printing control device used in a printing apparatus including a plurality of the printing control devices that shares and performs control of a printing section and a driving control section that controls driving of a printing mechanical mechanism on the basis of commands issued from the printing control devices. The printing control device includes: an input section that inputs a first command; a command generation section that generates a second command from the inside of the printing control device; a management section that manages the first and second commands in an acquired order; an instruction section that outputs the first and second commands in the managed order; an output section that outputs the commands, which is received from the instruction section, to the driving control section; and a synchronization section that synchronizes the commands in the respective output sections of the plurality of printing control devices, outputs the corresponding commands to the output sections. When the output section determines whether the command received from the instruction section is the first command or the second command, if the command is the first command, the output section performs synchronization using the synchronization section, and outputs the corresponding first command, but if the command is the second command, the output section does not perform synchronization using synchronization section, and outputs the corresponding second command.

According to the aspect of the invention, the output section determines whether the command received from the instruction section is the first command or the second command. If the command is the first command, the output section performs synchronization using the synchronization section, and outputs the command to the driving control section. In contrast, if the command is the second command, the output section does not perform synchronization using synchronization section, and outputs the command to the driving control section. As a result, even when the second command generated from the inside of the printing control device is not present in a different printing control device, it is possible to reduce errors which are caused by out-of-synchronization resulting from the commands to be output not being synchronized between a plurality of printing control devices.

In the printing control device according to the aspect of the invention, it is preferable that the printing control device should further include a communication section that communicates with the different printing control device. In addition, it is also preferable that the printing control device should transmit the second command to the different printing control device through the communication section.

According to the aspect of the invention, the printing control device transmits the second command to the different printing control device through the communication section. From the result of the transmission, for example, the second command generated from the inside of one printing control device is also present in the other printing control device. When transmitted through the communication section, as compared with the one printing control device that generates the second command from the inside thereof, the second command arrives in the other printing control device with a delay of time necessary for the communication. Hence, in the meantime, for example, when the first command is input to each printing control device, the orders of acquisition of the commands in the respective management sections are mismatched between the plurality of printing control devices. However, the second command is output without performing synchronization using the synchronization section (that is, even when commands are not synchronized). Therefore, even if the order of commands is out of synchronization, it is possible to reduce occurrence of errors caused by the commands not being synchronized by the synchronization section.

In the printing control device according to the aspect of the invention, it is preferable that a plurality of components provided in the printing apparatus should be shared among and connected to the plurality of printing control devices. It is preferable that the printing control device should further include a detection section that detects states of the shared components. It is also preferable that the command generation section should generate the second command on the basis of the detection result of the detection section.

According to the aspect of the invention, the second command, generated on the basis of the detection result of the detection section that detects the states of the components which are shared among and connected to the printing control devices, is present only in one printing control device taking charge of the detection target component. Even in this case, it is possible to reduce occurrence of errors which are caused by the commands to be output not being synchronized between the plurality of printing control devices by the synchronization section.

In the printing control device according to the aspect of the invention, it is preferable that the second command should be an error command which is generated by the command generation section when the detection section detects an error.

According to the aspect of the invention, when the detection section detects an error, the error command is generated by the command generation section. Since the command is the error command, even when the command is not synchronized and is output, no problem arises. For example, even when error commands are generated only by for example one printing control device, an operation of the mechanical mechanism performed by the driving control section should be stopped. Therefore, even when the commands are not synchronized and are output, there is no problem.

In the printing control device according to the aspect of the invention, it is preferable that each of the plurality of printing control devices should be connected to a host control section, which generates print data, through the input section, and one printing control device of the plurality of printing control devices is connected to the driving control section through the input section. It is also preferable that the first command issued from the driving control section should be transmitted to the other printing control device through the one printing control device. In addition, it is also preferable that the management section should have a first management section, which manages the first command acquired from the host control section through the input section in order of acquisition, and a second management section which manages the first command acquired from the driving control section in order of acquisition.

According to the aspect of the invention, the first management section manages the first command acquired from the host control section in order of acquisition, and the second management section manages the first command acquired from the driving control section in order of acquisition. The first command acquired from the driving control section is sent to the one printing control device, and is then sent to the other printing control device. Hence, until the first command arrives in the other printing control device after being sent to the one printing control device, the host control section may send a command. In this case, the order of acquisition of commands acquired in the management section of the one printing control device becomes different from the order of acquisition of commands acquired in the management section of the other printing control device. However, regardless of the orders of acquisition, the first command issued from the host control section is managed in the first management section, and the first command issued from the driving control section is managed in the second management section. Then, the instruction section of each printing control device outputs the command from the associated one of the first management section and the second management section of each printing control device. As a result, the commands, which are output by the respective instruction sections to the respective output sections, are synchronized. Thus, it is possible to reduce errors which are caused by out-of-synchronization resulting from the commands not being synchronized by the synchronization section.

In the printing control device according to the aspect of the invention, it is preferable that priorities should be set for the first management section and the second management section. In addition, it is also preferable that the management section should have an output portion that outputs the commands in order from the higher set priority one of the first management section and the second management section.

According to the aspect of the invention, the output portion of the management section outputs the first commands in order from the higher set priority one of the first management section and the second management section. As a result, the commands, which are output from the output portion, are synchronized. Thus, it is possible to reduce errors which are caused by out-of-synchronization resulting from the commands not being synchronized by the synchronization section.

According to another aspect of the invention, there is provided a printing apparatus including: a plurality of the printing control devices that shares and performs control of a printing section on the basis of print data; and a driving control section that controls driving of a printing mechanical mechanism on the basis of commands issued from the printing control device. The printing control device is the printing control device according to the above-mentioned aspect of the invention. According to the aspect of the invention, there are provided the printing control device according to the above-mentioned aspect of the invention. Therefore, the printing apparatus is able to exhibit the same effect as the printing control device according to the above-mentioned aspect of the invention.

According to a further aspect of the invention, there is provided a printing control method used in a printing apparatus including a plurality of the printing control devices that shares and performs control of a printing section and a driving control section that controls driving of a printing mechanical mechanism on the basis of commands issued from the plurality of printing control devices. The printing control method includes: an input step of inputting a first command; a command generation step of generating a second command from the inside of the printing control device; a management step of managing the first and second commands in an acquired order; and an instruction step of outputting the first and second commands in the managed order; and an output step of determining whether the command output and received in the instruction step is the first command or the second command, if the command is the first command, synchronizing the commands in the respective output sections of the respective printing control devices through a synchronization section, and outputting the first command to the driving control section, but if the command is the second command, not performing synchronization through the synchronization section, and outputting the second command to the driving control section. According to the aspect of the invention, it is possible to obtain the same effects as the printing control device according to the above-mentioned aspect of the invention.

BRIEF DESCRIPTION OF THE DRAWINGS

The invention will be described with reference to the accompanying drawings, wherein like numbers reference like elements.

FIG. 7 is a block diagram illustrating processing of outputting commands.

DESCRIPTION OF EXEMPLARY EMBODIMENTS

First Embodiment

Hereinafter, a printing control device of a lateral-type ink jet printer according to a first embodiment of the invention will be described with reference to FIGS. 1 to 7.

Figure 1:
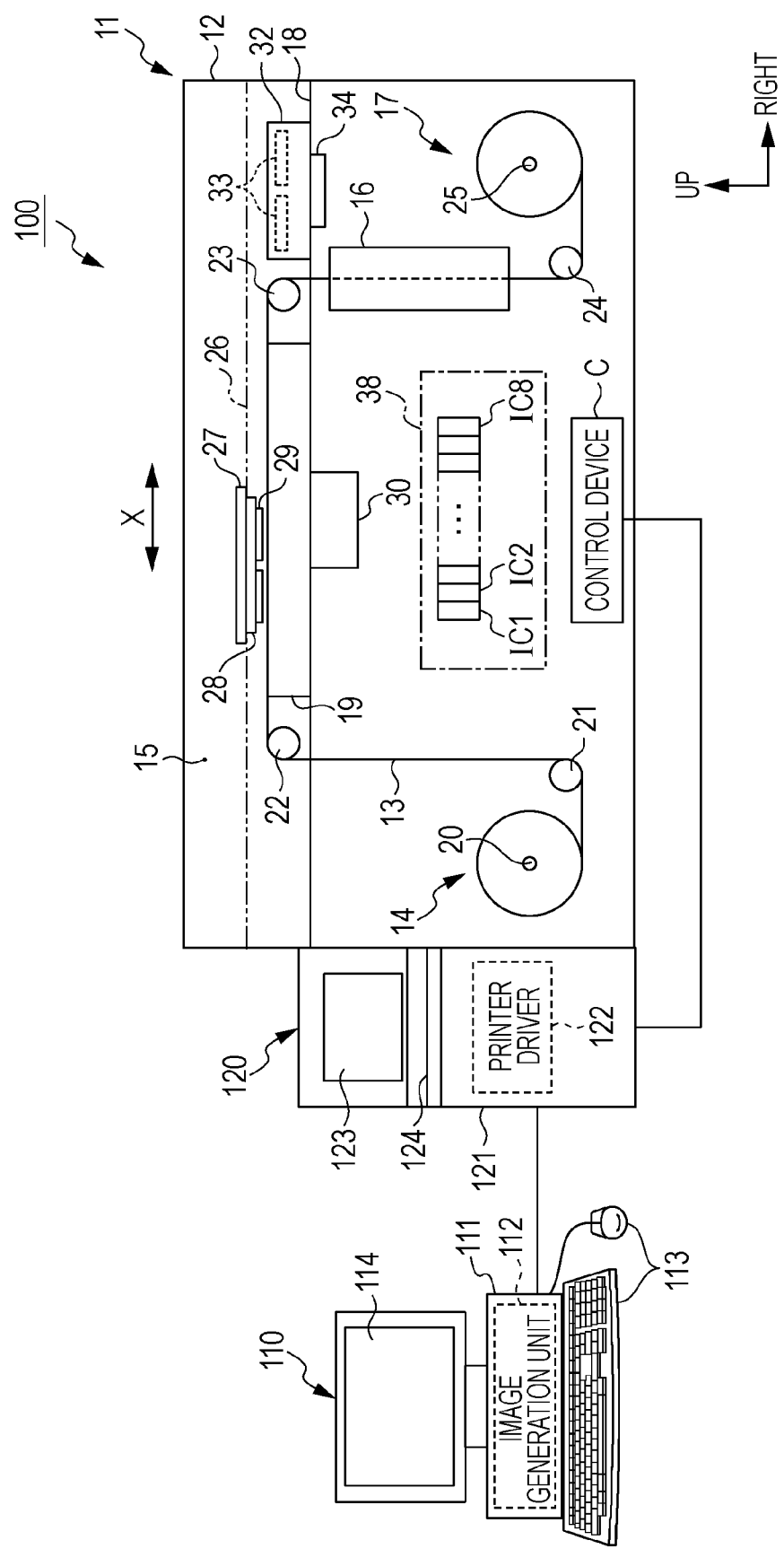
FIG. 1 is a schematic side view of a printing system according to a first embodiment.

FIG. 1 is a schematic diagram of the printing system having a lateral-type ink jet printer. As shown in FIG. 1, a printing system 100 includes: an image generation device 110 that generates image data; a host device 120 that generates print data based on the image data which is received from the image generation device 110; a lateral-type ink jet printer (hereinafter simply referred to as a "printer 11") as an example of the printing apparatus that prints an image based on the print data which is received from the host device 120.

The image generation device 110 is constituted by for example a personal computer, and has an image generation section 112 that is built by causing a CPU in a main body 111 thereof to execute software for creating an image. A user activates the image generation section 112 so as to create an image on a monitor 114 through an operation of the input device 113, and operates the input device 113 so as to give an instruction to print the image. Then, the image data associated with the image is transmitted to the host device 120 through a prescribed communication interface.

The host device 120 is constituted by for example a personal computer, and has a printer driver 122 that is built by causing a CPU in a main body 121 thereof to execute software for the printer driver. The printer driver 122 generates print data on the basis of the image data which is received from the image generation device 110, and transmits the print data to a control device C installed in the printer 11. The control device C controls the printer 11 on the basis of the print data which is received from the printer driver 122, and causes a printer 11 to print the image based on the print data. In addition, the monitor 123 displays a menu screen, a printing target image, and the like for inputting and setting set values for control to and in the printer 11.

Next, a configuration of the printer 11 shown in FIG. 1 will be described. It should be noted that, in the following description of the specification, the "horizontal direction" and the "vertical direction" are based on the directions indicated by the arrows in the drawings such as FIG. 1. Further, in FIG. 1, the near side is the front side, and the inside is the rear side.

As shown in FIG. 1, the printer 11 has a body casing 12 having a rectangular parallelepiped shape. The body casing 12 is provided with: a feeding unit 14 that continuously feeds out a long sheet 13; a printing chamber 15 that performs printing by ejecting ink onto the sheet 13; a drying device 16 that applies a drying process to the sheet 13 onto which the ink is adhered by the printing; and a wind-up unit 17 that winds up the sheet 13 on which the drying process is performed.

Specifically, the body casing 12 is provided with a plate-like table 18 which is positioned near and slightly above the center thereof so as to partition the inside of the body casing 12 into the upper and lower areas. The upper area of the table 18 is formed as a printing chamber 15 which is supported by a rectangular-plate-like supporting member 19 on the table 18. In addition, in the lower area of the table 18, the feeding unit 14 is disposed at the position close to the left side thereof as the upstream side thereof in the transport direction of the sheet 13, and the drying device 16 and the wind-up unit 17 are disposed at the position close to the right side thereof as the downstream side.

As shown in FIG. 1, in the feeding unit 14, a winding shaft 20, which extends in the front-rear direction, is rotatably provided, and the sheet 13, which is wound in advance around the winding shaft 20 in a roll shape, is supported to be rotatable integrally with the winding shaft 20. That is, the sheet 13 is continuously fed out from the feeding unit 14 by rotation of the winding shaft 20. Further, the sheet 13, which is continuously fed out from the feeding unit 14, can be wound around a first roller 21 which is positioned on the right side of the winding shaft 20, and is thus guided upward.

On the other hand, the second roller 22 is provided parallel to the first roller 21, which is on the lower side thereof, at the position that is on the left side of the supporting member 19 and corresponds to that of the first roller 21, which is on the lower side thereof, in the vertical direction. In addition, the sheet 13, of which the transport direction is changed into the vertically up direction by the first roller 21, is suspended on the lower left portion of the second roller 22. Thereby, the transport direction thereof is changed into the horizontally right direction, and the sheet 13 comes into contact with the top face of the supporting member 19.

Further, a third roller 23, which is opposed to the second roller 22 on the left side thereof with the supporting member 19 interposed therebetween, is provided parallel to the second roller 22 on the right side of the supporting member 19. In addition, the position of the top of each of the circumferential faces of the second roller 22 and the third roller 23 is adjusted to be at the same height as the top face of the supporting member 19.

The sheet 13, of which the transport direction is changed into the horizontally right direction by the second roller 22 positioned on the left side in the printing chamber 15, comes into contact with the top face of the supporting member 19, and is transported to the right side as the downstream side. Thereafter, the sheet 13 is suspended on the upper right portion of the third roller 23 such that the transport direction thereof is changed into the vertically down direction, and is transported toward the drying device 16 on the lower side of the table 18. Then, the sheet 13, on which the drying process is performed by passing through the inside of the drying device 16, is further transported in the vertically down direction. Thereafter, the sheet 13 is suspended on the fourth roller 24 such that the transport direction thereof is changed into the horizontally right direction, and is wound in a roll shape by rotating a winding shaft 25 of the wind-up unit 17, which is disposed on the right side of the fourth roller 24, on the basis of driving force of a transport motor 61 (refer to FIG. 3).

As shown in FIG. 1, paired guide rails 26 (indicated by the chain double-dashed line in FIG. 1), which extend in the horizontal direction, are provided on either side of the front and rear of the supporting member 19 in the printing chamber 15. The upper surfaces of the guide rails 26 are set higher than the upper surface of the supporting member 19. The upper surfaces of both guide rails 26 support a rectangular carriage 27 capable of reciprocating in the main scanning direction X (the horizontal direction in FIG. 1), which is shown in FIG. 1, along the guide rails 26 on the basis of driving of a first carriage motor 62 (refer to FIG. 3). The carriage 27 can be moved in the sub-scanning direction (the front-rear direction which is orthogonal to the paper in FIG. 1) on the basis of driving of a second carriage motor 63 (refer to FIG. 3). Further, a plurality of recording heads 29 is supported, on the lower surface side of the carriage 27, by a supporting plate 28 interposed therebetween.

A certain range from the left end to the right end of the supporting member 19 is set as a printing area, whereby the sheet 13 is intermittently transported in units of the printing area. Then, in accordance with the reciprocation of the carriage 27, the ink is ejected onto the sheet 13, which is stopped on the supporting member 19, from the recording heads 29, thereby printing the sheet 13.

In addition, at the time of printing, a suctioning device 30, which is provided on the lower side of the supporting member 19, is driven to generate a suction power which is based on a negative pressure applied to a plurality of suction holes which are opened on the top face of the supporting member 19, thereby attaching the sheet 13 to the top face of the supporting member 19. Then, when a single operation of printing is completely performed on the sheet 13, the negative pressure of the suctioning device 30 is released, and the sheet 13 is transported.

Further, in the printing chamber 15, a maintenance device 32, which is for performing maintenance of the recording heads 29 when not performing the printing, is provided in a non-printing area which is on the right side of the third roller 23. The maintenance device 32 has a cap 33 and an elevating device 34 for each recording head 29. Each cap 33 moves, by driving of the elevating device 34, between a capping position at which the cap comes into contact with a nozzle formation surface 35 (refer to FIG. 2) of the recording head 29 and a withdraw position at which the cap is separated from the nozzle formation surface 35.

Further, as shown in FIG. 1, in the body casing 12, a plurality of (for example, eight) ink cartridges IC1 to IC8, which contains respective inks having different colors from each other, is detachably mounted. The ink cartridges IC1 to IC8 are connected to the recording heads 29 through ink supply passages 70A and 70B and the like (refer to FIG. 3), and the recording heads 29 eject inks, which are supplied from the ink cartridges IC1 to IC8. Hence, the exemplary printer 11 is able to perform color printing using the eight color inks. In addition, an openable cover 38 is provided at the position corresponding to the position at which the ink cartridges IC1 to IC8 are disposed in the body casing 12. The operation for replacing the ink cartridges IC1 to IC8 is performed by opening the cover 38.

The eight ink cartridges IC1 to IC8 contain the inks of for example black (K), cyan (C), magenta (M), yellow (Y), and the like. In addition, it is possible to adopt a configuration in which a humidity-retention-liquid cartridge containing a humidity retention liquid is mounted. It is apparent that, since it is possible to appropriately set the ink types (the number of colors), it is also possible to adopt a configuration in which monochrome printing uses only black ink or a configuration in which two color inks or three or more color inks, of which the number is optional, other than eight color inks are used.

The respective ink cartridges IC1 to IC8 are electrically connected to the control device C through a cartridge holder (not shown). Thus, a non-volatile storage element 47 (refer to FIG. 3), which is mounted on each of the ink cartridges IC1 to IC8, stores information on the remaining ink level of the corresponding color.

Figure 2:
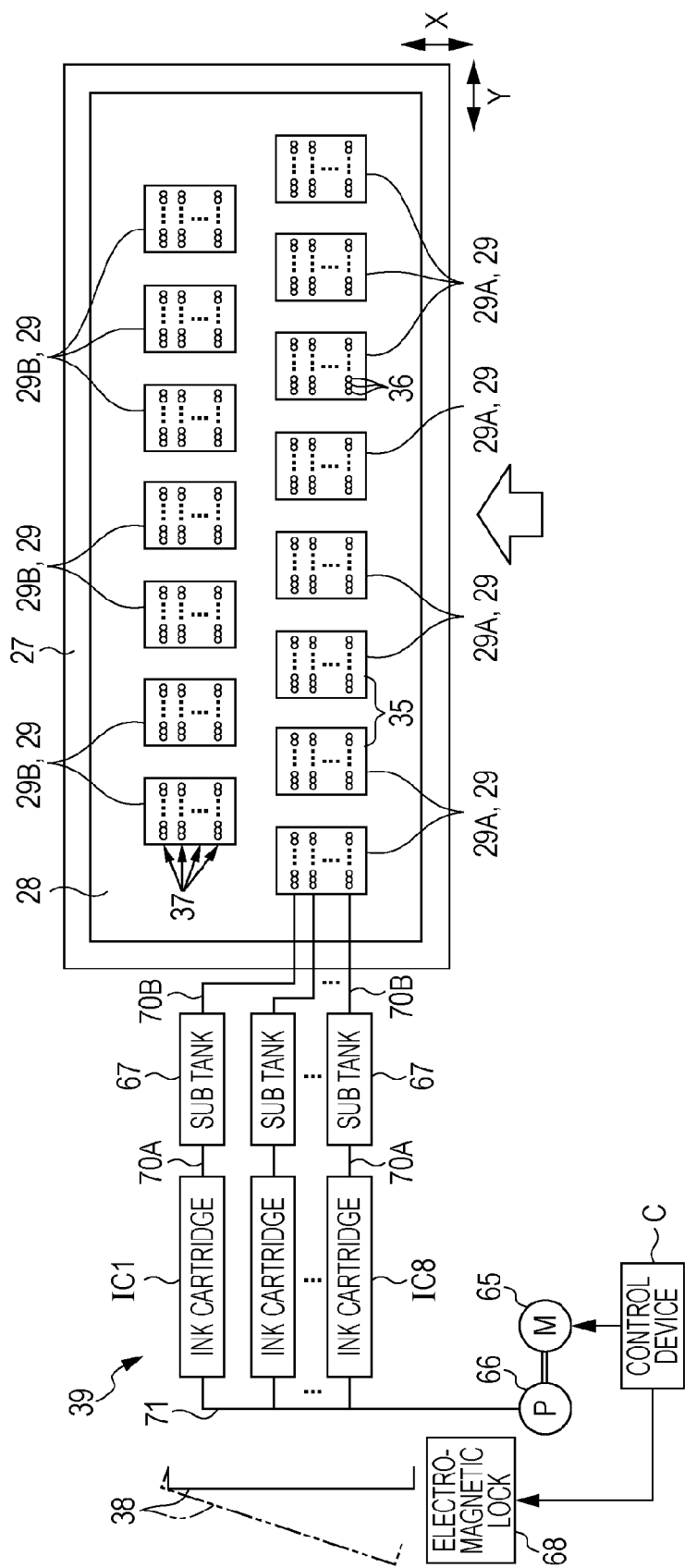
FIG. 2 is a schematic diagram illustrating a bottom face of a recording head and an ink supply device.

FIG. 2 is a schematic diagram illustrating the plurality of recording heads, which are provided on the bottom face of the carriage, and the ink supply device which supplies inks to the respective recording heads. As shown in FIG. 2, the supporting plate 28, which is supported on the lower face side of the carriage 27, supports the plurality of (in the embodiment, 15) recording heads 29 arranged in a staggered manner in the widthwise direction (the front-rear direction) orthogonal to the transport direction (the direction indicated by the outlined arrow in FIG. 2) of the sheet 13. That is, in the 15 recording heads 29, the recording heads 29A and 29B, which are arranged in two rows with a certain pitch along the sub-scanning direction Y, are arranged in a staggered manner by a half of the pitch in the sub-scanning direction Y. In addition, a plurality of (in the embodiment, eight) nozzle arrays 37, each of which has a plurality of nozzles 36 arranged in a single row along the front-rear direction (the sub-scanning direction Y), is formed with predetermined intervals in the main scanning direction X on the nozzle formation surfaces 35 as the lower surfaces of the respective recording heads 29.

As shown in FIG. 2, an ink supply device 39, which is for supplying the respective recording heads 29 with the inks of the respective colors, is provided. The ink supply device 39 has a pump motor 65, a pressure pump 66, the ink cartridges IC1 to IC8, and sub-tanks 67.

The ink cartridges IC1 to IC8 are respectively connected to the sub-tanks 67 through the ink supply passages 70A (for example, tubes) in a state where the cartridges are mounted in the cartridge holder, and the sub-tanks 67 are connected to each recording head 29 through the ink supply passages 70B (for example, tubes). However, FIG. 2 shows a connection relation between a plurality of (for example, eight) sub-tanks 67 and the single recording head 29. As it is, from the single sub-tank 67, the ink supply passages 70B, of which the number is the same as that of the recording heads 29, extend, and thus each ink supply passage 70B is connected to each recording head 29.

Further, the ink cartridges IC1 to IC8 are connected to a discharging outlet of the pressure pump 66 through an air supply passage 71 in a state where the cartridges are mounted in the cartridge holder. The control device C drives the pump motor 65 such that the pressure pump 66 is driven to pump, thereby supplying pressurized air, which is discharged from the pressure pump 66, to the inside of the ink cartridges IC1 to IC8 through the air supply passage 71.

Since an ink pack is housed in each ink cartridge IC, the ink pack is pressed by the pressurized air which is supplied to the inside of the ink cartridge IC through the air supply passage 71, thereby pressurizing and supplying ink from the ink cartridge IC to the ink supply passage 70A. The ink, which is supplied from the ink cartridge IC, is supplied to the sub-tank 67 through the ink supply passages 70A, and is supplied from the sub-tank 67 to each recording head 29 through the ink supply passage 70B.

Further, in the body casing 12, an electromagnetic lock 68, which locks the cover 38 in a closed state, is provided at the position corresponding to the rotation end of the cover 38 in the closed state indicated by the solid line in FIG. 2. For example, an operation switch 72 (refer to FIG. 3), by which a user operates locking and unlocking of the cover 38, is provided at the position near the cover 38 in the body casing 12. The control device C excites the electromagnetic lock 68 in response to an input of a lock signal transmitted when the operation which locks the cover 38 is performed by using the operation switch 72, thereby locking the cover 38 in the closed state. Further, the control device C demagnetizes the electromagnetic lock 68 in response to an input of an unlock signal transmitted when the operation which unlocks the cover 38 is performed by using the operation switch 72, thereby unlocking the cover 38. When the cartridges are replaced, as shown in FIG. 2, in a state where the cover 38 is opened as indicated by the chain double-dashed line (where a maximum degree of opening is larger that that in FIG. 2), at least one of the ink cartridges IC1 to IC8 is replaced, the cover 38 is closed again as indicated by the solid line in FIG. 2, and then the operation switch 72 is operated so as to thereby lock the cover 38 in the closed state.

Figure 3:
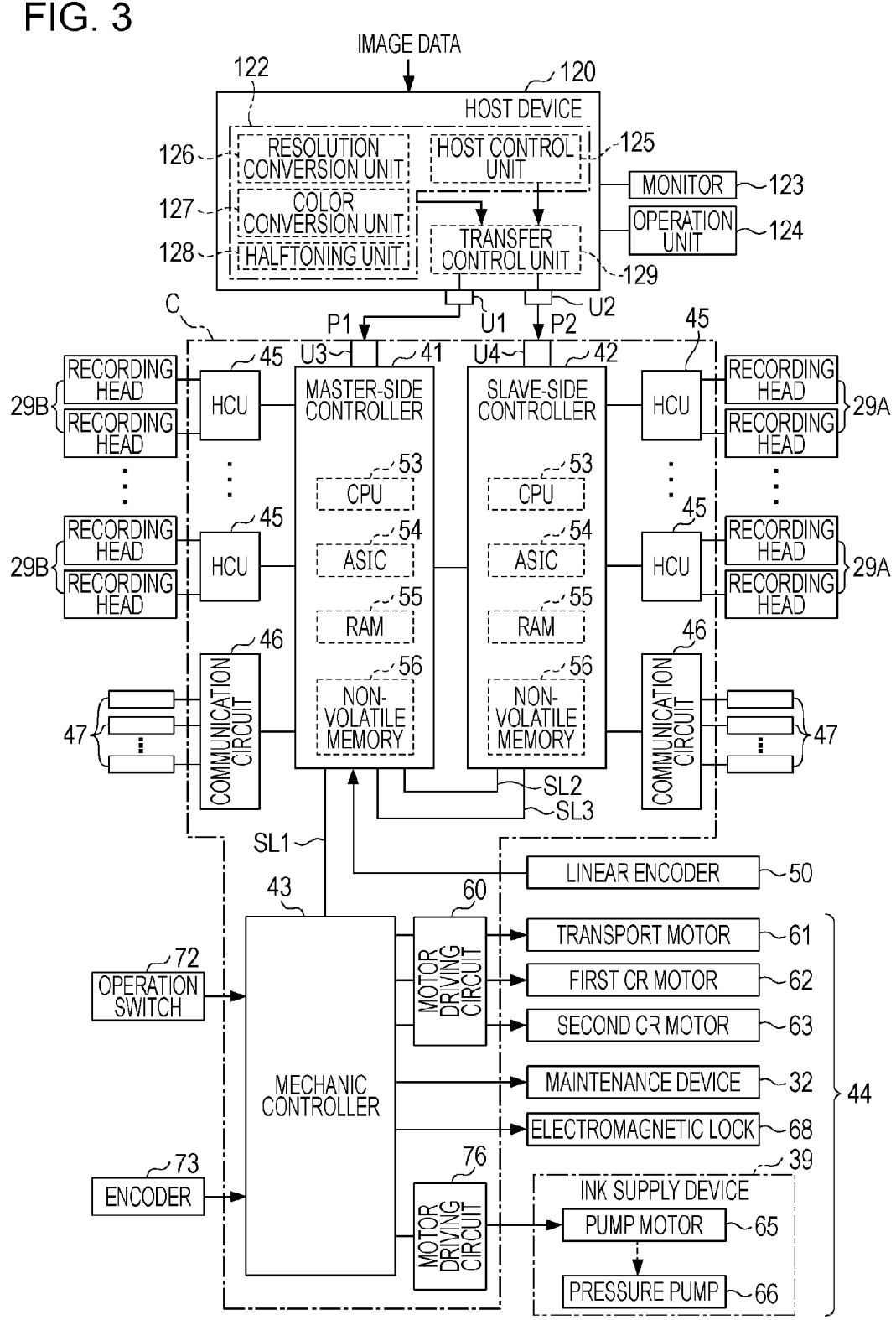
FIG. 3 is a block diagram illustrating an electric configuration of the printing system.

FIG. 3 is a block diagram illustrating an electric configuration of the printing system 100. The printer driver 122 in the host device 120 shown in FIG. 3 controls display of various screens such as a menu screen and a printing condition setting screen to be displayed on the monitor 123, and has a host control unit 125 that performs prescribed processing in response to the operation signal which is input from the operation unit 124 in the display state of each screen. The host control unit 125 integrally controls the printer driver 122. Further, the printer driver 122 is provided with a resolution conversion unit 126, a color conversion unit 127, and a halftoning unit 128 each of which performs image processing necessary to generate the print data on the image data received from the image generation device 110 at the upper stage. The resolution conversion unit 126 performs resolution conversion processing for converting display resolution of the image data into printing resolution. The color conversion unit 127 performs color conversion processing for performing color conversion from a color coordinate system for display (for example, a RGB color coordinate system, or a YCbCr color coordinate system) into a color coordinate system for printing (for example, a CMYK color coordinate system). Furthermore, the halftoning unit 128 performs halftoning for gray-level conversion, and the like so as to convert the high-gray-level pixel data for display (for example, 256 gray levels) into the low-gray-level pixel data for printing (for example, 2 or 4 gray levels). Then, the printer driver 122 assigns commands written by printing control codes (for example, ESC/P) to the printing image data generated from the results of the image processing, thereby generating print job data (hereinafter simply referred to as "print data PD").

The host device 120 has a transfer control unit 129 that performs data transfer control. The transfer control unit 129 performs serial transfer so as to transfer, in sequence, the print data PD, which is generated by the printer driver 122, to the printer 11 in units of packet data with a predetermined volume.

On the other hand, the control device C on the printer 11 side has a pair of controllers 41 and 42 which performs various kinds of control including control of a recording system in response to receiving the print data PD from the host device 120. The pair of controllers 41 and 42 shares control of the plurality of (in this example, 15) recording heads 29 by dividing the recording heads into two groups each including a predetermined number (in this example, one is 7 and the other is 8) of recording heads. That is, the master-side controller 41 takes charge of control of 7 recording heads 29B, and the slave-side controller 42 takes charge of control of 8 recording heads 29A.

The printer driver 122 in the host device 120 shown in FIG. 3 divides the print image data into two pieces in accordance with the positions of recording heads 29 corresponding to the two controllers 41 and 42, and assigns the same print language description commands to the respective divided pieces of the print image data, thereby generating two sets of print data P1 and P2.

As shown in FIG. 3, the host device 120 according to the embodiment has two serial communication ports U1 and U2. Further, the two controllers 41 and 42 respectively have serial communication ports U3 and U4. In addition, the transfer control unit 129 performs serial transfer of the print data P1 corresponding to the master-side controller 41 through communication between the serial communication ports U1 and U3, and performs serial transfer of the print data P2 corresponding to the slave-side controller 42 through communication between the serial communication ports U2 and U4. The host device 120 performs serial transfer through two systems using the two serial communication ports U1 and U2, thereby transferring the print data P1 and P2 to the respective controllers 41 and 42 at a relative high speed. In addition, in the embodiment, the serial communication ports U2 and U4, which input commands with a format where the commands are included in the print data P1 and P2, are examples of the input sections.

As shown in FIG. 3, the two controllers 41 and 42 are connected to a plurality of (N (in this example, 4)) head control units 45 (hereinafter simply referred to as "HCU 45"), and each HCU 45 is connected to the plurality of (M (in this example, 2)) recording heads 29.

Further, respective communication circuits 46, which are connected to the two controllers 41 and 42, are connected to four storage elements 47 which are a half of eight storage elements 47 mounted in the eight ink cartridges IC1 to IC8. The master-side controller 41 is able to communicate with the respective storage elements 47 which are mounted in the four ink cartridges IC1 to IC4. In addition, the slave-side controller 42 is able to communicate with the respective storage elements 47 which are mounted in the four ink cartridges IC5 to IC8. Each storage element 47 is constituted by a non-volatile storage element (a non-volatile memory). The storage element 47 stores various kinds of ink-related information such as information on the remaining ink level of the ink cartridge IC, ink color information, information on expiration date for use, maintenance information, and serial-number information. In addition, in a state where the ink cartridge IC (refer to FIG. 2) is mounted in the cartridge holder, the storage element 47 is electrically connected to the terminal portion of the cartridge holder side, whereby the communication circuit 46 is connected to the storage element 47 so as to be able to perform communication to readout and write.

The master-side controller 41 manages the remaining ink levels and the like of the four ink cartridges IC1 to IC4 as exemplary components, and one slave-side controller 42 manages the remaining ink levels and the like of the four ink cartridges IC5 to IC8 as exemplary components. The master-side controller 41 is able to read and write the ink-related information by communicating with the respective storage elements 47 of the ink cartridges IC1 to IC4 through the communication circuit 46. Likewise, the slave-side controller 42 is able to read and write the ink-related information by communicating with the respective storage elements 47 of the ink cartridges IC5 to IC8 through the communication circuit 46.

Moreover, the control device C has a mechanical controller 43 which is connected to the output side (the control downstream side) of the master-side controller 41 through a communication line SL1. The mechanical controller 43 takes charge of control of the mechanical mechanism 44 mainly including a transport system and a carriage driving system. In a step in which it is possible to prepare for printing of the seven recording heads 29B associated with master-side controller 41 (that is, prepare the print image data used in ink droplet ejection control) and it is also possible to prepare for printing of the eight recording heads 29A associated with the slave-side controller 42, the master-side controller 41 transmits a carriage activation command to the mechanical controller 43. Thereby, it is possible to prevent ejection failure, in which the ink droplets are not ejected regardless of whether the recording heads 29 arrives at the ejection position, caused by activation of the carriage 27 before completion of the printing preparation of one of the controllers 41 and 42.

Further, in a step in which the printing of the seven recording heads 29B associated with the master-side controller 41 is completed and the printing of the eight recording heads 29A associated with the slave-side controller 42 is completed, the master-side controller 41 transmits a transport command for transporting the sheet 13 to the mechanical controller 43. Thereby, it is possible to prevent deviation of the landing position (deviation of the printing position) of the ink droplets, which are ejected from the recording heads 29 onto the sheet 13, caused by transport start (or release of the adhesion of the sheet onto the supporting member 19) of the sheet 13 in a step before completion of the printing preparation of one of the controllers 41 and 42. As described above, the master-side controller 41 has a function of transmitting commands in progress synchronization with the slave-side controller 42. In addition, both controllers 41 and 42 are divided into the slave-side controller, which outputs a command to the other controller, and the master-side controller which outputs a command to the mechanical controller 43 when checking that the command received from the slave-side controller is synchronized with its own command and contents of the commands coincide with each other. In the embodiment, the master-side controller is different from the slave-side controller in a structure for performing synchronization under control.

As shown in FIG. 3, the master-side controller 41 is connected to a linear encoder 50. The linear encoder 50 is provided along the moving path of the carriage 27, and thus the master-side controller 41 receives an input of a detection signal (an encoder pulse signal), having pulses of which the number is proportional to the moving distance of the carriage 27, from the linear encoder 50. The encoder pulse signal, which is input to the master-side controller 41, is transferred to the slave-side controller 42 through a signal line SL2 which is connected between both controllers 41 and 42. Further, the master-side controller 41 and the slave-side controller 42 are connected to each other through a communication line SL3 used in synchronization processing.

As shown in FIG. 3, each of the controllers 41 and 42 has a CPU 53 (central processing unit), an ASIC 54 (Application Specific IC), a RAM 55, and a non-volatile memory 56. The CPU 53 executes programs stored in the non-volatile memory 56, thereby performing various tasks necessary for the printing control. Further, the ASIC 54 performs print data processing, data processing for the recording system, and the like.

On the other hand, the mechanical controller 43 is connected to a transport motor 61, a first carriage motor (hereinafter referred to as a "first CR motor 62"), and a second carriage motor (hereinafter referred to as a "second CR motor 63") constituting the mechanical mechanism 44 through a motor driving circuit 60. Further, the mechanical controller 43 is connected to a maintenance device 32 and an electromagnetic lock 68. Furthermore, the mechanical controller 43 is connected to the pump motor 65 constituting the ink supply device 39 through a motor driving circuit 76. Thus, by driving the pump motor 65, the pressure pump 66 is driven.

Further, the mechanical controller 43 is connected to the above-mentioned operation switch 72 and an encoder 73 as input systems. The mechanical controller 43 excites the electromagnetic lock 68 when a lock operation signal is input from the operation switch 72, and demagnetizes the electromagnetic lock 68 when an unlock operation signal is input from the operation switch 72. The mechanical controller 43 controls driving of the motors 61 to 63 and 65, the maintenance device 32, and the electromagnetic lock 68 in response to various commands which are received from the master-side controller 41 through the communication line SL1.

In order for the next target printing area of the sheet 13 to be disposed on the supporting member 19 by driving the transport motor 61 at the time of printing, the control device C performs: a transport operation that transports the sheet 13; an adhesion operation that adheres the next target printing area to the supporting member 19 after transport of the sheet; a printing operation that prints the sheet 13 by using the recording heads 29; and an adhesion release operation that releases the adhesion of the sheet 13 after end of the single operation (the operation corresponding to a single page) of the printing. At this time, the printing operation is performed by ejecting ink droplets from the recording heads 29 while moving the carriage 27 in the main scanning direction X. The printing operation is performed by repeating, a predetermined number of times, movement (a single pass operation) of the carriage 27, which is performed by driving the first CR motor 62, in the main scanning direction X, and movement of the carriage 27, which is performed for each time the single pass operation ends, in the sub-scanning direction Y.

Figure 4:
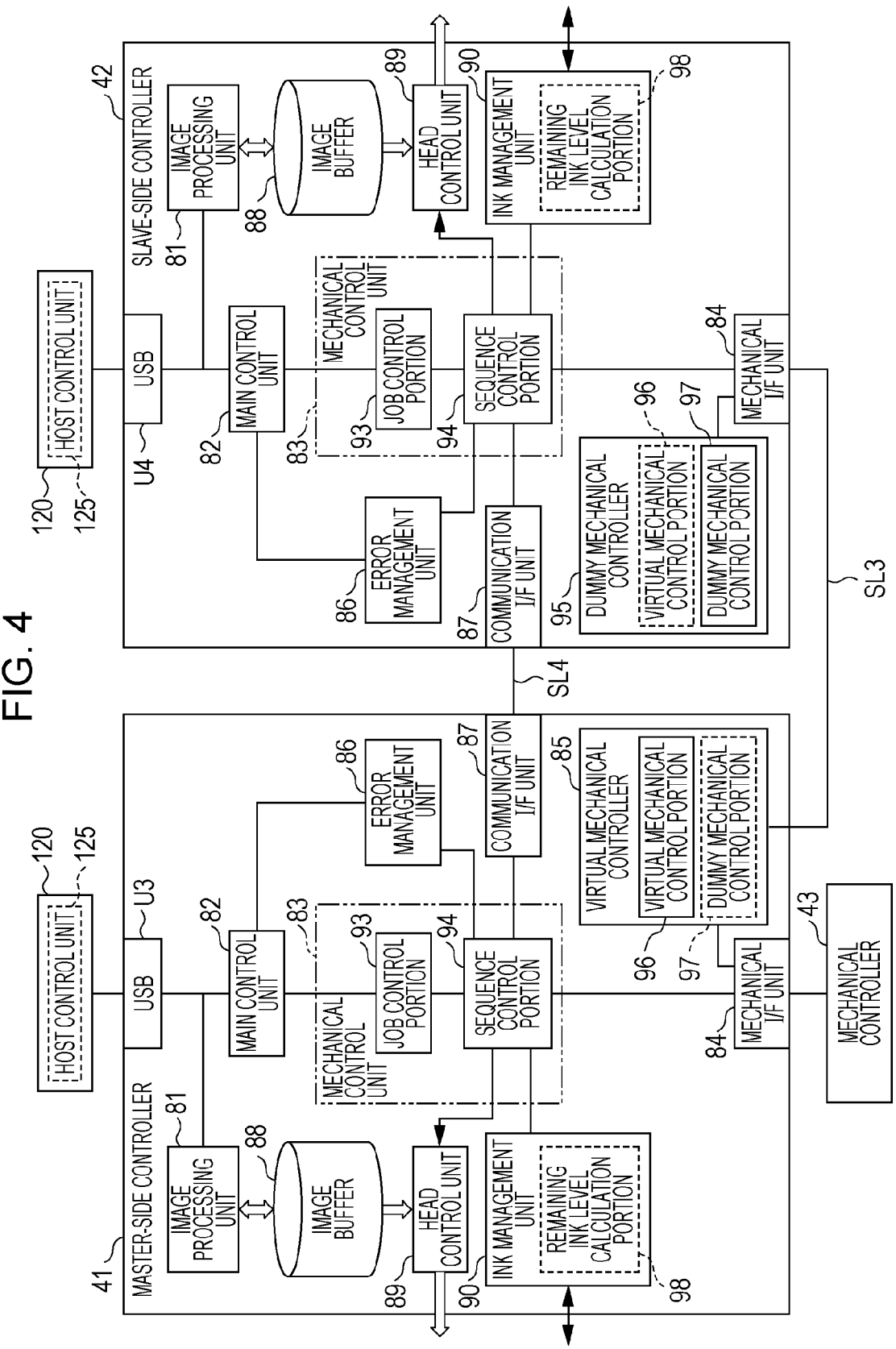
FIG. 4 is a block diagram illustrating a functional configuration of the respective master/slave controllers.

FIG. 4 is a block diagram illustrating functional configurations of the master-side controller 41 and the slave-side controller 42. As shown in FIG. 4, both controllers 41 and 42 are configured to be symmetrical to each other. The reason is that the master-side and slave-side controllers 41 and 42 can be implemented by the same program configuration. In addition, since the controllers have a symmetrical configuration (substantially the same functional configuration), hereinafter, the configuration of the master-side controller 41 will be described, and as compared therewith, a partially different configuration of the slave-side controller 42 will be described.

As shown in FIG. 4, the master-side controller 41 includes: a serial communication port U3 as an example of an input section; an image processing section 81; a main control unit 82, a mechanical control unit 83; a mechanical I/F unit 84 as an example of an output section; and a virtual mechanical controller 85 as an example of a synchronization section. Further, the master-side controller 41 includes: an error management unit 86; a communication I/F unit 87 as an example of a communication section; an image buffer 88; a head control unit 89; and an ink management unit 90 as an example of a detection section. On the other hand, the slave-side controller 42 is different from the master-side controller 41 only in that that the slave-side controller 42 includes a dummy mechanical controller 95 instead of the virtual mechanical controller 85, and the other configuration is the same. In addition, the main control unit 82 integrally controls the respective sections 83 to 90.

Further, the mechanical I/F unit 84 of the slave-side controller 42 is connected to the virtual mechanical controller 85 of the master-side controller 41 through the communication line SL3. That is, the mechanical I/F unit 84 of the master-side controller 41 is connected to the actual mechanical controller 43, while the mechanical I/F unit 84 of the slave-side controller 42 is connected to the virtual mechanical controller 85 installed in the master-side controller 41. In order to output a command to the mechanical controller 43, in practice, the slave-side mechanical I/F unit 84 transmits a command to the virtual mechanical controller 85.

The image processing section 81 on the master-side controller 41 side shown in FIG. 4 performs image processing such as decompression processing, command analysis, micro-weave processing, and vertical-to-horizontal conversion processing of the print data P1 which is input by the serial communication port U3. On the other hand, the image processing section 81 on the slave-side controller 42 side shown in FIG. 4 performs image processing such as decompression processing, command analysis, micro-weave processing, and vertical-to-horizontal conversion processing of the print data P2 which is input by the serial communication port U4.

The image processing section 81 temporarily stores the decompressed print data in the image buffer 88. Here, the print data P1 includes print image data and a print language description command. The main control unit 82 acquires a command for control by analyzing the print language description command in the decompressed print data P1, and sends the acquired command to the mechanical control unit 83. The image processing section 81 sequentially performs the necessary image processing operations such as allocation processing (the micro-weave processing) for allocating dots to nozzles in the print image data and the vertical-to-horizontal conversion processing, thereby generating head control data used in control of the recording heads 29 and storing the data in the image buffer 88.

The head control unit 89 reads out the head control data from the image buffer 88, and divides the head control data for each recording head 29 so as to thereby assign and transfer the divided data pieces to each HCU 45. Moreover, the HCU 45 sequentially transmits the head control data corresponding to the recording head 29. The head driving circuit, which is not shown, in the recording head 29 controls driving of the ejection driving element provided for each nozzle 36 on the basis of the head control data, thereby ejecting ink droplets from the nozzle 36. At this time, the head control unit 89 generates an ejection timing signal on the basis of the encoder pulse signal which is input from the linear encoder 50, and the head driving circuit drives the ejection driving element on the basis of the ejection timing signal.

The mechanical control unit 83 shown in FIG. 4 sends the command, which is received from the main control unit 82, to the mechanical I/F unit 84. At this time, the mechanical control unit 83 monitors, for example, progress of the processing of the head control unit 89, and thus sends the command to the mechanical I/F unit 84 in a step in which it is possible to prepare for synchronous printing on the basis of the head control data used in printing in the next pass.

The mechanical I/F unit 84 performs a query on the virtual mechanical controller 85 when the command is received from the mechanical control unit 83. Then, when receiving an ACK signal (a positive acknowledge signal) as a response of the query from the virtual mechanical controller 85, the mechanical I/F unit 84 transmits the command to the mechanical controller 43. That is, when not receiving the ACK signal as the response of the query to the virtual mechanical controller 85, the mechanical I/F unit 84 is on standby until receiving the ACK signal, and transmits the command to the mechanical controller 43 when receiving the ACK signal. However, when the standby time for waiting the response (the ACK signal) reaches the set time and a timeout occurs, a retrial request is transmitted to the mechanical control unit 83.

In one slave-side controller 42, the image processing section 81, the main control unit 82, the mechanical control unit 83, and the mechanical I/F unit 84 also performs the same processing. However, a dummy mechanical controller 95 has a different function from the virtual mechanical controller 85. The dummy mechanical controller 95 immediately responds the ACK signal without condition when receiving the query from the mechanical I/F unit 84. Hence, when receiving the command from the mechanical control unit 83 and performing the query, the mechanical I/F unit 84 in the slave-side controller 42 directly receives the ACK signal from the dummy mechanical controller 95, and is thus able to output the command substantially without the standby time from the reception of the command.

In contrast, when receiving the query of the command from the master-side mechanical I/F unit 84, the master-side virtual mechanical controller 85 receives the command from the slave-side mechanical I/F unit 84 through the communication line SL3, and responds the ACK signal to each mechanical I/F unit 84 under a condition where both commands coincide with each other. Hence, the master-side mechanical I/F unit 84 waits for a response generated when it is determined that the commands from both master-side and slave-side mechanical I/F units 84 are synchronized in the virtual mechanical controller 85 and the both synchronized commands coincide with each other, and outputs the commands to the mechanical controller 43 when receiving the response. With such a configuration, by synchronizing both master-side and slave-side controllers 41 and 42, it is possible to transmit the commands to the mechanical controller 43.

As shown in FIG. 4, the virtual mechanical controller 85 and the dummy mechanical controller 95 have the same configuration, and each thereof has a virtual mechanical control portion 96 and a dummy mechanical control portion 97. When the virtual mechanical control portion 96 is activated, it functions as the virtual mechanical controller 85. In addition, when the dummy mechanical control portion 97 is activated, it functions as the dummy mechanical controller 95. Which one of the virtual mechanical control portion 96 and the dummy mechanical control portion 97 is activated depends on determination of the main control unit 82 as to whether the main control unit 82 is the master or the slave. If it is determined that the main control unit 82 is the master, the virtual mechanical control portion 96 is activated to be available, and the dummy mechanical control portion 97 is inactivated to be unavailable. In contrast, if it is determined that the main control unit 82 is the slave, the dummy mechanical control portion 97 is activated to be available, and the virtual mechanical control portion 96 is inactivated to be unavailable.

Further, when receiving a command from the mechanical controller 43, the master-side mechanical I/F unit 84 shown in FIG. 4 sends the command to the virtual mechanical controller 85. The virtual mechanical controller 85 transmits the command received from the master-side mechanical I/F unit 84 to the slave-side mechanical I/F unit 84, and then responds the ACK signal to the master-side mechanical I/F unit 84. The master-side mechanical I/F unit 84 receives the response (the ACK signal) from the virtual mechanical controller 85, and then sends the command to the mechanical control unit 83 at the upper stage. In the embodiment, the input function part, which inputs the command from the mechanical controller 43 in the mechanical I/F unit 84, is configured as an example of the input section. In the embodiment, a "first command" includes: commands which are input by the serial communication ports U3 and U4 with a format where the commands are included in the print data from the host control unit 125; commands which are generated by the host control unit 125 separately from the print data and are input by the serial communication ports U3 and U4; and a command which is input by the mechanical I/F unit 84 from the mechanical controller 43.

However, when the commands are not synchronized through the synchronization processing in the virtual mechanical controller 85, the master-side mechanical I/F unit 84 is unable to receive the ACK signal from the virtual mechanical controller 85. Hence, the standby time reaches the set time, and thus a timeout occurs. On the other hand, the mechanical I/F unit 84 of the slave-side controller 42 is also unable to receive the ACK signal from the virtual mechanical controller 85. Hence, the standby time reaches the set time, and thus a timeout occurs. In this case, the mechanical I/F unit 84 issues a retrial request to the mechanical control unit 83. When receiving the retrial request, the mechanical control unit 83 retransmits (reissues) the command to the mechanical I/F unit 84. Further, although the master-side and slave-side commands are synchronized through the synchronization processing in the virtual mechanical controller 85, if it is determined that both synchronized commands do not coincide with each other, the virtual mechanical controller 85 does not respond the ACK signal to the mechanical I/F unit 84. In this case, also the mechanical I/F unit 84 issues the retrial request to the mechanical control unit 83.

The communication I/F unit 87 is provided in order for each head control unit 89 and each ink management unit 90, which are provided on the master side and the slave side, to perform communication for performing synchronization of processing or interchanging mutual information.

The ink management unit 90 shown in FIG. 4 has a remaining-ink-level calculation portion 98. The remaining-ink-level calculation portion 98 acquires amounts of eight-color inks consumed by about a half of the recording heads 29B (or 29A). Here, the head control unit 89 counts the number of dots corresponding to the number of ink droplet ejection operations of the recording heads 29B (or 29A) on the basis of the print image data. The remaining-ink-level calculation portion 98 acquires the number of dots for each ink color from the head control unit 89, and sums the number of dots for each color, thereby calculating the amount of ink consumed for each ink color by the recording heads 29B (or 29A) on the basis of the summed number of dots for each color. In such a manner, the master-side remaining-ink-level calculation portion 98 calculates the amount of ink consumed in the seven recording heads 29B for each color, and one slave-side remaining-ink-level calculation portion 98 calculates the amount of ink consumed in the eight recording head 29A for each color.

In the embodiment, the ink cartridges IC1 to IC8 with the plurality of colors is shared and managed by the master-side controller 41 and the slave-side controller 42. Hence, among the amounts of eight-color inks, which are consumed by the recording heads 29B (or 29A) on the own controller side, calculated by the remaining-ink-level calculation portion 98, the amounts of consumed four-color inks, which corresponds to the four ink cartridges IC managed by the other controller, are configured to be notified to the other controller through communication between the respective communication I/F units 87 and 87.

In predetermined periods of time such as when the single operation of the printing ends, when the cartridges are replaced, and when the power is off at the time of performing an OFF operation by using the power switch (not shown), the ink management unit 90 transmits the information on the amounts of consumed four-color inks, which are managed by the other controller, to the ink management unit 90 of the other controller through the mechanical control unit 83 and the communication I/F unit 87. Then, the remaining-ink-level calculation portion 98 adds the amounts of four-color inks, which are consumed by the recording heads 29A managed by the other controller, received by the ink management unit 90 and the amounts of the same four-color inks, which are consumed by the recording heads 29B, for the respective colors, thereby respectively calculating the amounts of four-color inks, which are consumed by all the recording heads 29A and 29B. Furthermore, the remaining-ink-level calculation portion 98 respectively subtracts the amounts of consumed four-color inks from the previous remaining ink levels of the four colors, thereby calculating the current remaining ink levels of the four colors. The current remaining-ink-level information is temporarily stored in a prescribed storage area of the RAM 55. In predetermined periods of time such as when the cover 38 is opened or closed, when the single operation (one job) of the printing ends, and when power is off, the ink management unit 90 writes the current remaining ink levels, which are read out from the RAM 55, into the non-volatile memory 56 and the storage element 47.

The ink management unit 90 detects ink-related errors by monitoring the ink cartridge IC states other than managing the remaining ink levels. The ink management unit 90 determines whether or not each remaining ink level, which is calculated by the remaining-ink-level calculation section 98, is less than a threshold value of running out of ink. If the remaining ink level is less than the threshold value, it is determined that the ink runs out. For example, if a certain allowable printing time passes after the ink runs out or a time passes until a certain allowable amount of ink is consumed, the errors, by which the printing operation is forcibly stopped, are notified to the error management unit 86 through the mechanical control unit 83. Further, even when misalignment of the ink cartridge IC or mounting of the different-color ink cartridge IC is detected, the error is notified to the error management unit 86 through the mechanical control unit 83.

When receiving the error notifications, generated in the controllers 41 and 42, such as error notification issued from the ink management unit 90, the error management unit 86 determines the content of the error, and issues an error command which has a type corresponding to the content of the determined error. The error command types are identified by parameter values thereof. The error command is sent to the main control unit 82, and is further sent from the main control unit 82 to the mechanical control unit 83. Furthermore, in the embodiment, the error management unit 86 and the ink management unit 90 as an example of the detection section exemplify a command generation section.

The mechanical control unit 83 includes: a job control portion 93 that controls an execution sequence of the commands; and a sequence control portion 94 that receives the commands, which are output in the sequence controlled by the job control portion 93, and controls the output timing of the commands so as to perform the sequence control. In addition, in the embodiment, the job control portion 93 exemplifies a management section, and the sequence control portion 94 exemplifies an instruction section.

Figure 5:
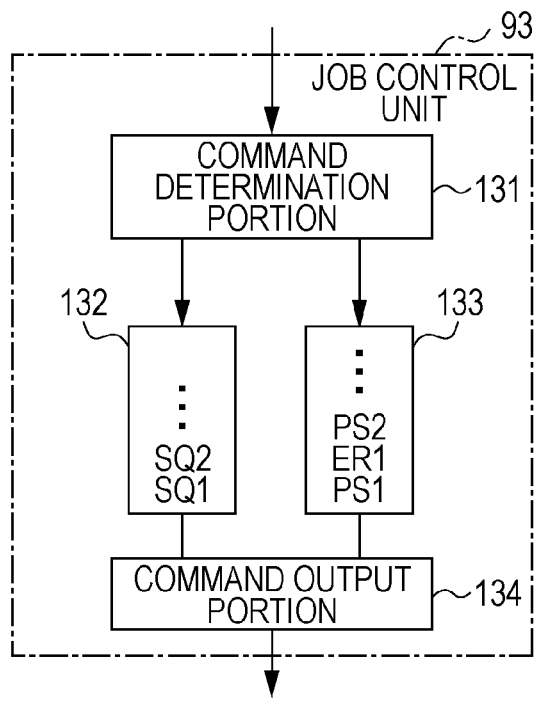
FIG. 5 is a block diagram illustrating a configuration of a job control portion.

FIG. 5 shows a configuration of the job control portion 93. The job control portion 93 includes a command determination portion 131, a sequence queue 132, an immediate queue 133, and a command output portion 134. The command, which is sent from the main control unit 82 to the mechanical control unit 83, is input to the job control portion 93. Here, examples of the commands include: a command for the sequence control (hereinafter referred to as a "sequence command") which can be obtained by analyzing the print language description command included in the print data PD; an internally generated command (hereinafter referred to as an "internal command") which is generated on the basis of the detection results of various kinds of detection processing performed in the controllers 41 and 42; and the like.

Hence, examples of the command queues include a sequence queue 132, of which the issue sequence is important, and an immediate queue 133 which should be immediately processed. The commands (the sequence commands) of the sequence queue 132 are issued from the host control unit 125, mechanical controller 43. Therefore, the sequence is not changed between the plurality of controllers 41 and 42.

The immediate queue 133 also receives the commands, which are issued from the mechanical controller 43 and the host device 120, at substantially the same time. Therefore, when those are directly issued, both commands are synchronized through the synchronization processing in the virtual mechanical controller 85. Although there is some deviation (time lag) in the issue timings between the master-side and the slave-side and thus the retrial is performed, both commands are synchronized through the synchronization processing in the virtual mechanical controller 85 based on the retrial of either one thereof.

In contrast, the internal commands, which are generated inside the controllers 41 and 42 similarly to the error notification and the like, uses communication which is performed through the communication I/F units 87 and 87 between the controllers 41 and 42, and are thereby transmitted to the (opposite side) other controller. The reason is that, in order to synchronize both master-side and slave-side controllers 41 and 42 in the virtual mechanical controller 85, it is necessary to prepare the same commands in both controllers 41 and 42. The communication between the controllers 41 and 42 through the communication I/F units 87 and 87 is serial communication, and thus a relatively long time is necessary to transfer the commands. Hence, during the time period from when the internal command is generated in one of both controllers 41 and 42 to when the command arrives in the other controller, the command of the mechanical controller 43 or the host device 120 may be issued. In this case, the sequence of the stored commands is not guaranteed between both master-side and slave-side immediate queues 133.

The command determination portion 131 shown in FIG. 5 determines whether the received command is the sequence command or an emergency command (the immediate command) of which a degree of emergency is high. In accordance with the determination result, the command determination portion 131 stores the sequence commands in the sequence queue 132, and stores the emergency commands in the immediate queue 133. The commands are stored in each of the queues 132 and 133 in order of acquisition.

The internal command is a high emergency command as typified by the error command, and is thus stored in the immediate queue 133. The internal command, which is stored in the immediate queue 133, is output in preference to the sequence queue 132. On the other hand, the sequence command is a command in which the execution sequence is important, and is thus output in the storage sequence thereof when the internal command is not stored in the immediate queue 133. Under such an output regulation, the command output portion 134 preferentially outputs the internal command from the immediate queue 133, and in a state where the storage command is absent in the immediate queue 133, the sequence command stored in the sequence queue 132 is output in the storage sequence.

For example, from the sequence queue 132 shown in FIG. 5, the sequence commands SQ1, SQ2, . . . are output in this order which is based on the storage sequence thereof. Further, from the immediate queue 133, the command PS1, ER1, PS2 . . . are output in this order which is based on the storage sequence thereof. Here, the "command PS" represents a command which is issued by the host device 120, and the "command ER" represents the internal command which is issued in the controllers 41 and 42. The command PS is issued on the basis of, for example, the screen operation of the host device 120 and the like performed by a user.

The command output portion 134 waits for the request or the response to the job control portion 93 from the sequence control portion 94 on the downstream side, and outputs (issues) the command. When receiving the response to the effect that the previous command is output from the mechanical I/F unit 84 through the sequence control portion 94, the command output portion 134 outputs the subsequent command. Further, when receiving a retrial request (a retransmission request) to the effect that the command is retransmitted from the mechanical I/F unit 84 through the sequence control portion 94, the command output portion 134 retransmits the previous output command.

When receiving the internal command from the job control portion 93, the sequence control portion 94 shown in FIG. 4 directly outputs the internal command. Further, when receiving the sequence command, the sequence control portion 94 receives a response to the effect that the previous prescribed operation ends from the mechanical controller 43 through the mechanical I/F unit 84, and then outputs a command at the start timing of the operation to be performed after the corresponding prescribed operation.

When receiving the sequence command, the sequence control portion 94 outputs the sequence command to the mechanical I/F unit 84 at a predetermined timing based on a predetermined sequence. Examples of the commands include a transport command, a suction-attachment command, a first carriage activation command (a carriage main-scanning-direction movement command), a second carriage activation command (a carriage sub-scanning-direction movement command), a suction-attachment-release command, and the like. The mechanical control unit 83 transmits such a sequence command at a timing appropriate for progress of the head control unit 89 (refer to FIG. 4) or at a timing appropriate for progress of the mechanical controller 43 side.

FIG. 7 is a block diagram illustrating processing of outputting commands. In addition, FIG. 7 shows only the immediate queue 133 in the job control portion 93. As shown in FIG. 7, the respective flows (indicated by the arrows in the drawing) of processing performed inside the master-side controller 41 and the slave-side controller 42 are the same.

As shown in FIG. 7, the mechanical I/F unit 84 has a determination portion 135. The determination portion 135 determines whether or not the command that the mechanical I/F unit 84 receives from the sequence control portion 94 is the internal command. Specifically, the determination portion 135 is able to determine whether the internal command is the command, which is issued by the host control unit 125 (the host device 120), or the command which is issued by the mechanical controller 43. In the embodiment, the command includes an identifier (for example, a predetermined-bit identification number) for identifying the command type, and thus the determination portion 135 determines whether or not the command is the internal command on the basis of the identifier of the command. In addition, instead of the configuration in which each command is provided with an identifier for identifying the type thereof, it may be possible to adopt a configuration in which only the internal command is provided with an identifier. Further, it may be possible to adopt a configuration in which a flag is set in a packet for sending the command such that the determination is made on the basis of the flag value. As an example of the identifier, there is a command number.

Hereinafter, command output processing in the embodiment will be described with reference to FIGS. 6A to 6D and 7. The main control unit 82 outputs, to the mechanical control unit 83, a command which is obtained by the command analysis of the input print data, a command which is input from the host device 120, a command which is input from the mechanical controller 43 (an input step), and commands which are issued from the inside of the controllers 41 and 42 (a command generation step). The type of the command, which is input to the mechanical control unit 83, is determined by the command determination portion 131. The command determination portion 131 determines, on the basis of the identifier included in the command, whether the input command is the sequence command as an example of the first command or the emergency command which includes the internal command as an example of the second command. On the basis of the determination result, the sequence command is stored in the sequence queue 132 in the order of acquisition, and the emergency command is stored in the immediate queue 133 in the order of acquisition (a management step).

The command output portion 134 outputs the command, which is stored in the immediate queue 133, in preference to the sequence command which is stored in the sequence queue 132. Hence, basically, while the command is present in the immediate queue 133, the output of the command preferentially progresses.

Figure 6A:
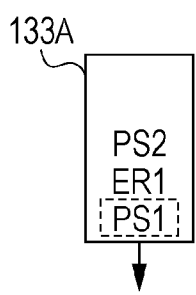
FIGS. 6A to 6D are schematic diagrams illustrating processing in a queue.

FIGS. 6A to 6D show the master-side and slave-side immediate queues 133A and 133B. In addition, in the queues 133 of FIGS. 6A to 6D, the commands, which are surrounded by the dashed line, among the commands stored in the bottom are output to the mechanical controller 43. For example, it is assumed that an error occurs in the master-side controller 41. After the command PS1 is received from the host device 120, the error occurs in the master-side controller 41. Then, while this situation is notified to the slave-side controller 42, the command PS2 is received from the host device 120. In this case, as shown in FIG. 6A, the commands PS1, ER1, and PS2 are stored in the master-side queue 133A in this order, and the commands PS1 and PS2 are stored in the slave-side queue 133B in this order. At this time, in the slave-side queue 133B, the error command ER1 has not yet arrived (the state in FIG. 6A).

In the state of the storage in FIG. 6A, the job control portion 93 outputs the commands PS1 and PS2, which are at the most downstream storage position (the lowest position in FIG. 7) in the immediate queue 133, to the sequence control portion 94 ((1) in FIG. 7). The sequence control portion 94 outputs the command, which is received from the job control portion 93, to the mechanical I/F unit ((2) in FIG. 7) (an instruction step). In this case, the command is the emergency command, and is thus immediately output.

When receiving the command, the mechanical I/F unit 84 performs a query of the command PS1 on the mechanical controller 85 on the master side ((3) in FIG. 7), and performs a query of the command PS1 on the dummy mechanical controller 95 on the slave side ((3) in FIG. 7).

On the slave side, when receiving the query, the dummy mechanical controller 95 immediately responds the ACK signal unconditionally ((4) in FIG. 7). When receiving the response, the slave-side mechanical I/F unit 84 outputs the command PS1 to the communication line SL3 ((5) in FIG. 7). The output command PS1 is received by the master-side virtual mechanical controller 85.

When receiving the commands from both master-side and slave-side mechanical I/F units 84, the virtual mechanical controller 85 determines whether or not both commands coincide with each other. If both coincide with each other, the virtual mechanical controller 85 responds the ACK signal to the master-side mechanical I/F unit 84 ((6) in FIG. 7). In this case, the virtual mechanical controller 85 determines that the commands PS1 and PS1 coincide with each other, and thus responds the ACK signal to the master-side mechanical I/F unit 84. Then, when receiving the response of the ACK signal, the master-side mechanical I/F unit 84 transmits the command to the mechanical controller 43 ((7) in FIG. 7). That is, at the timing at which it is confirmed that the same commands are synchronized on both of the master side and the slave side in the synchronization processing of the virtual mechanical controller 85, the command PS1 is transmitted from the master-side mechanical I/F unit 84 to the mechanical controller 43 (an output step).

When outputting the command to the mechanical controller 43, the mechanical I/F unit 84 sends the response of the effect of the command output to the job control portion 93 through the sequence control portion 94. When receiving the response of the effect of the command output, the job control portion 93 outputs the subsequent command. As described above, the job control portion 93 sequentially outputs the commands one by one.

Figure 6B:
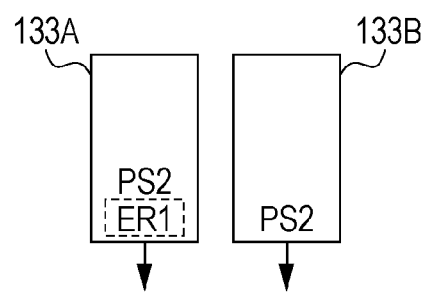

After the commands PS1 and PS1 are issued, both queues 133A and 133B attain storage states shown in FIG. 6B. The command output portion 134 issues the respective commands ER1 and PS2 at the most downstream storage positions from both queues 133A and 133B. The issued commands ER1 and PS2 are respectively sent to the master-side and slave-side mechanical I/F units 84 ((1) and (2) in FIG. 7).

In this case, in the master-side mechanical I/F unit 84, the determination portion 135 determines that the command ER1 is the internal command. As a result, the master-side mechanical I/F unit 84 immediately outputs the command ER1 to the mechanical controller 43 without performing a query for the synchronization processing on the virtual mechanical controller 85, that is, without using the virtual mechanical controller 85 (an output step). On the other hand, in the slave-side mechanical I/F unit 84, the determination portion 135 determines that the command PS2 is not the internal command. As a result, the command PS2 is sent to the virtual mechanical controller 85 in order to perform the synchronization processing, but the commands are not synchronized, and a timeout occurs. Therefore, the slave-side mechanical I/F unit 84 issues the retrial request to the mechanical control unit 83.

Figure 6C:
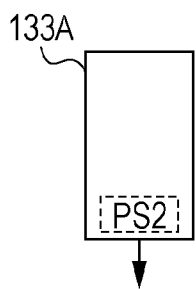

Hence, as shown in FIG. 6C, the command PS2 which is requested to be retried remains in the queue 133B. Further, the command ER1 which arrives with a delay is stored in the slave-side queue 133B. In the state of FIG. 6C, the commands PS2 and PS2 are respectively issued from both queues 133A and 133B. In this case, through the synchronization processing in the virtual mechanical controller 85, it is confirmed that the same commands PS2 and PS2 are synchronized. As a result, the master-side mechanical I/F unit 84 receives the response of the ACK signal from the virtual mechanical controller 85. The master-side mechanical I/F unit 84 which receives the response, outputs the command PS2 to the mechanical controller 43.

Figure 6D:
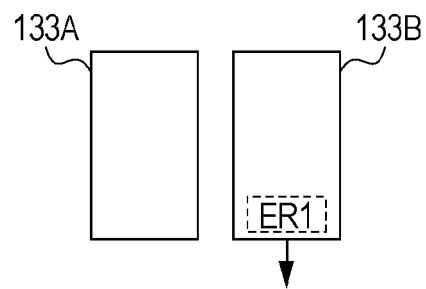

Thereafter, both queues 133A and 133B attain storage states shown in FIG. 6D. The slave-side command output portion 134 issues the command ER1 from the queue 133B. In the slave-side mechanical I/F unit 84, the determination portion 135 determines that the command ER1 is the internal command. As a result, the command ER1 is transmitted to the virtual mechanical controller 85. In this case, since the received command ER1 is the internal command, even if the command is not synchronized, the virtual mechanical controller 85 sends the command to the master-side mechanical I/F unit 84.

In the master-side mechanical I/F unit 84, the determination portion 135 determines that the command ER1, which is received from the virtual mechanical controller 85, is the internal command, and thus immediately outputs the command to the mechanical controller 43 as it is. At this time, the command, which is received from the virtual mechanical controller 85, can be specified as the internal command by the determination in the slave-side mechanical I/F unit 84. Therefore, it may be possible to adopt a configuration in which the determination of the determination portion 135 in the master-side mechanical I/F unit 84 is omitted, and the command, which is received from the virtual mechanical controller 85, is immediately output to the mechanical controller 43.

As described above, even when the sequence of the commands stored in both queues 133A and 133B is different, all the commands PS1, ER1, PS2, and ER1 are output to the mechanical controller 43. In the embodiment, the error command ER1 is output to the mechanical controller 43 twice. The error command ER1 is used when the operation of the mechanical controller 43 is intended to be stopped at the time of occurrence of an error. In the error command, three steps of "immediate stop", "stop after capping", and "do nothing" are specified depending on a parameter thereof. For example, even when the same error command, in which the parameter of the stop command is specified, is sent twice, the stop command is simply received when the operation is already stopped, and thus there is no particular problem.

As described above in detail, according to the embodiment, the following effects can be obtained.

(1) In the master-side mechanical I/F unit 84, the determination portion 135 determines that the command, which is received from the mechanical control unit 83, is the internal command (the second command), and then the internal command is output to the mechanical controller 43 through the synchronization processing performed by the virtual mechanical controller 85. As a result, even when the communication through the communication line SL4 takes a relatively long time, thus the timing for acquiring the internal command through the controller of the transmission destination is delayed, and for this reason, the sequence of the commands stored in the respective queues 133 in the respective controllers 41 and 42 becomes different, and it is possible to avoid occurrence of command transmission error caused by out-of-synchronization between commands in the virtual mechanical controller 85.

(2) The error commands, which are generated when the respective controllers 41 and 42 detect an error, are output without performing the synchronization processing, and thus it is possible to avoid the situation in which the error commands are not output to the mechanical controller 43. Further, the same error commands are doubly notified to the mechanical controller 43 from the respective master-side and slave-side controllers 41 and 42. However, even if the mechanical controller 43 receives the subsequent error command after stopping the operation of the mechanical mechanism 44 in response to the previous output error command, the operation is already stopped, and thus practically nothing is performed, and no problem arises.

(3) If the internal command is the error command, even when the internal command is output without undergoing the synchronization processing, there is no problem. For example, even when the error command is generated in only one controller of the plurality of controllers 41 and 42, the operation of the mechanical mechanism 44 should be stopped. Therefore, even when the internal command is not synchronized and is output to the mechanical controller 43, there is no problem.

(4) When determining that the commands from the master-side and slave-side mechanical I/F units 84 are synchronized and coincide with each other, the virtual mechanical controller 85 responds the ACK signal to the master-side mechanical I/F unit 84, and the master-side mechanical I/F unit 84 transmits the commands to the mechanical controller 43 on the basis of the response of the ACK signal. Accordingly, by performing the synchronization between the master-side and slave-side controllers 41 and 42, it is possible to transmit the commands to the mechanical controller 43.

(5) The plurality of controllers 41 and 42 has the same functional configuration as shown in FIGS. 4 and 7, and thus can be implemented by a common program. In this case, by selecting one of the virtual mechanical control portion 96 and the dummy mechanical control portion 97 to be activated, it is possible to implement a different function. Therefore, the functions relating to the synchronization processing are partially different between the master side and the slave side, but the respective controllers 41 and 42 are implemented by a common program.

(6) The ink management unit 90 (the detection section) detects errors such as running out of ink (ink end) on the basis of the ink-related information, which is acquired from the storage element 47 of the ink cartridge IC and the amount of consumed ink which is calculated by the remaining-ink-level calculation portion 98. Then, it is determined in the mechanical I/F unit 84 that the error command, which is generated in the controller on the basis of the detection result of the running out of ink, is the internal command (the second command). Hence, the error command is immediately transmitted to the mechanical controller 43 without undergoing the synchronization processing of the virtual mechanical controller 85. Accordingly, at the time of running out of ink, it is possible to avoid the situation in which the command transmission error occurs.

Second Embodiment

Next, a second embodiment will be described with reference to FIGS. 8 to 11. The second embodiment is an embodiment for avoiding the command transmission error which is likely to occur in the first embodiment. In the first embodiment, the command PS (hereinafter referred to as a "host command PS") (the emergency command) issued from the host control unit 125 and the mechanical command MC (the emergency command) issued from the mechanical controller 43 are stored in the common queue 133. Here, when the storage sequences of the commands PS and MC stored in the queues 133A and 133B are different, the commands do not coincide with each other, and thus this causes the command transmission error. The second embodiment provides a configuration for solving the problem of such a type of the command transmission error.

Figure 8:
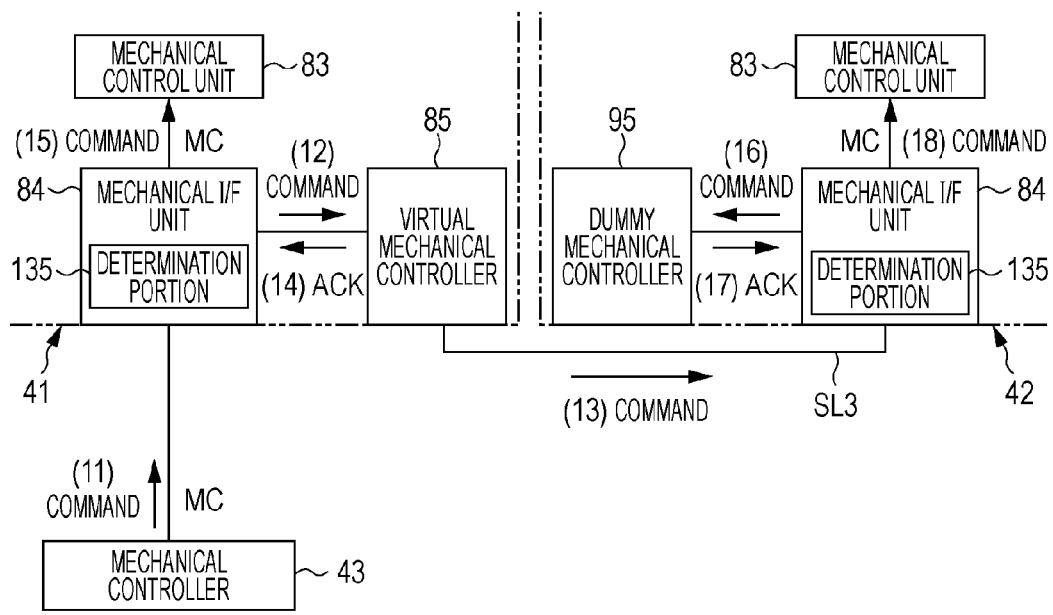
FIG. 8 is a block diagram illustrating processing of inputting a command from a mechanical controller.

FIG. 8 is a block diagram illustrating a sequence of command transmission from the mechanical controller 43 to the respective controllers 41 and 42. The sequence of command transmission was not described in detail in the first embodiment, but the sequence is the same as that of the first embodiment.

The mechanical controller 43 issues commands MC such as a state notification command, a request command, and an error command on the basis of the detection result of the detection system, not shown, provided in the mechanical mechanism 44 in order to detect the state and the operation thereof, and transmits the issued command MC to the master-side controller 41 ((11) in FIG. 8).

The master-side mechanical I/F unit 84, which receives the command MC, transmits the command to the virtual mechanical controller 85 ((12) in FIG. 8). The virtual mechanical controller 85 transmits the received command to the slave-side controller 42 through the communication line SL3 ((13) in FIG. 8), and after the transmission, responds the ACK signal to the master-side mechanical I/F unit 84 ((14) in FIG. 8). When receiving the response of the ACK signal from the virtual mechanical controller 85, the master-side mechanical I/F unit 84 transmits the command MC to the mechanical control unit 83 ((15) in FIG. 8).

On the other hand, when the slave-side mechanical I/F unit 84, which receives the command MC, sends the command MC to the dummy mechanical controller 95 ((16) in FIG. 8) and thereafter receives the ACK signal to be immediately returned ((17) in FIG. 8), the slave-side mechanical I/F unit 84 transmits the command MC to the slave-side mechanical control unit 83 ((18) in FIG. 8). Here, after the master-side controller 41 receives the command MC from the mechanical controller 43, the time, which is necessary for transmission of the command until the command MC is transmitted to the mechanical control units 83 and 83 of the controllers 41 and 42, becomes relatively long on the slave side, on which the serial communication using the communication line SL3 is performed, as compared with the master side on which only internal transmission of the controller is performed.

For example, when the command MC1 is transmitted from the mechanical controller 43 to the controllers 41 and 42, at substantially the same time, the command PS1 is transmitted from the host control unit 125 to the controllers 41 and 42. The command PS transmitted from the host control unit 125 is simultaneously sent through the serial communication between the serial communication ports U1 and U3 (or U2 and U4), and is stored in the respective queues 133A and 133B at substantially the same time.

Figure 9A:
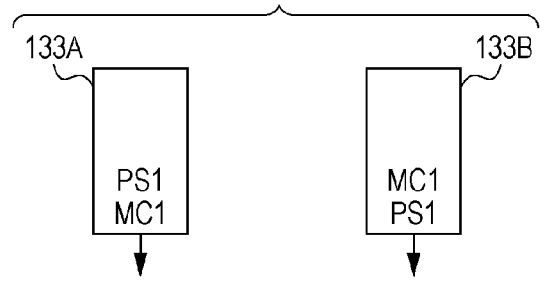
FIG. 9A is a schematic diagram illustrating processing in the queue according to the first embodiment.

For example, when the master-side controller 41 receives the command MC1 from the mechanical controller 43 and receives the command PS1 from the host control unit 125 with an extremely small delay, the commands MC1 and PS1 are stored in the master-side queue 133A in this order (FIG. 9A). On the other hand, the slave-side controller 42 receives the command MC1 from the mechanical controller 43 with a delay caused by the communication performed through the communication line SL3 as compared with the master side. Hence, the commands PS1 and MC1 are stored in the slave-side queue 133B in this order (refer to FIG. 9A). As described above, when the storage sequences of the commands in the queues 133A and 133B are different, the determination portion 135 does not determine that the commands MC1 and PS1 are the internal commands. Hence, the commands do not coincide with each other in the virtual mechanical controller 85, and those do not coincide even when the retrial is repeated, thereby causing the command transmission error. Further, the command MC1 may be a command of which the output path does not pass through the mechanical I/F unit 84 similarly to an exemplary case where the command is sent to the head control unit 89. In this case, when the other host command PS1 passes through the mechanical I/F unit 84, the opposite-side command does not arrive, and thus there is concern about the command transmission error caused by a timeout.

Figure 10:
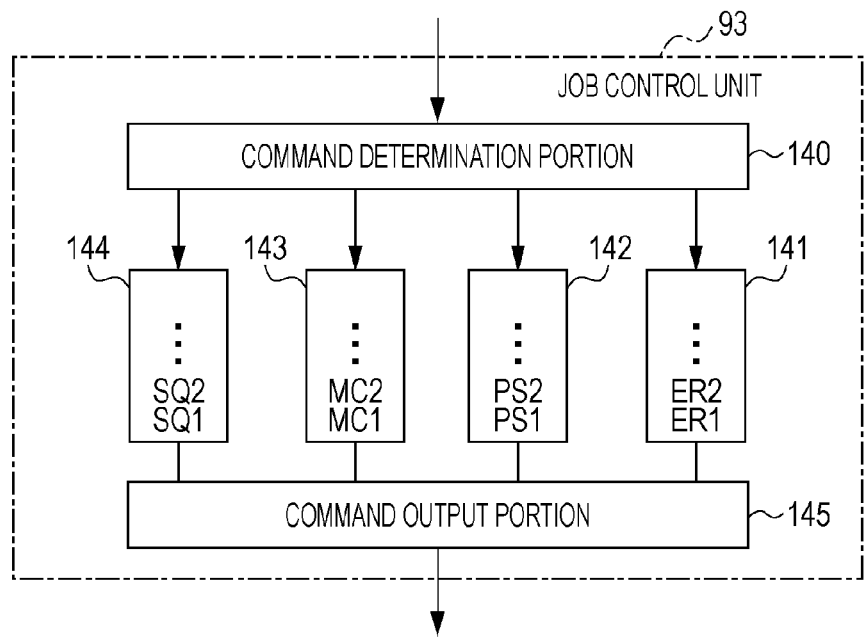
FIG. 10 is block diagram illustrating a configuration of a job control portion according to the second embodiment.

In the second embodiment, even when the storage sequences of commands other than such internal commands are different between the queues 133A and 133B, the job control portion 93 with the configuration shown in FIG. 10 is employed so as to be able to avoid occurrence of the command transmission error.

FIG. 10 shows a configuration of the job control portion 93 according to the embodiment. In addition, elements other than the job control portion 93 are common to the first embodiment. The description of the common elements to the first embodiment will be omitted, and only the configuration of the control portion 93 will be described in detail.

As shown in FIG. 10, the job control portion 93 as an example of the management section includes a command determination portion 140, a first queue 141, second queue 142, a third queue 143, a fourth queue 144, and a command output portion 145.

The command determination portion 140 determines the types (in this example, four types) of the input commands similarly to the first embodiment. The command determination portion 140 according to the embodiment determines which one of the internal command ER, the host command PS (the emergency command) issued from the host control unit 125, the mechanical command MC (the emergency command) issued from the mechanical controller 43, and the sequence command SQ is the input command.

Then, on the basis of the determination result, if the command is the internal command ER, the command determination portion 140 stores the command in the first queue 141. If the command is the host command PS, the command is stored in second queue 142. If the command is the mechanical command MC, the command is stored in the third queue 143. Furthermore, if the command is the sequence command SQ, the command is stored in the fourth queue 144. In the first embodiment, all the emergency commands are stored in the immediate queue 133, while in the second embodiment, the emergency commands are stored in the queues 141 to 143 such that the internal command, the host command PS, and the mechanical command MC are stored in different queues. Furthermore, in the embodiment, the second queue 142, in which the host command PS (the first command) from the host control unit 125 is stored, is configured as an example of the first management section, and the third queue 143, in which the mechanical command MC (the first command) from the mechanical controller 43 is stored, is configured as an example of the second management section.

Here, in the first to fourth queues 141 to 144, priorities of the queues outputting the commands are set. In the embodiment, in order of the first to fourth queues 141 to 144, the outputs of the commands are prioritized. The command output portion 145 as an example of the output unit determines a queue to output a command among the first to fourth queues 141 to 144 in accordance with the priorities of the respective queues, and controls the output sequence of the commands. In the embodiment, as described above, the first queue 141 is set to a first priority, the second queue 142 is set to a second priority, the third queue 143 is set to a third priority, and the fourth queue 144 is set to a fourth priority.

The command output portion 145 manages the command storage state of the respective queues 141 to 144, and gives priority to the output of the command from the first queue 141 while the command is present in the first queue 141. If the first queue 141 is vacant, the priority is given to the output of the command of the second queue 142. Furthermore, if all the first and second queues 141 and 142 are vacant, the priority is given to the output of the command of the third queue 143. In addition, if all the first to third queues 141 to 143 are vacant, the command of the fourth queue 144 is output.

Figure 9B:
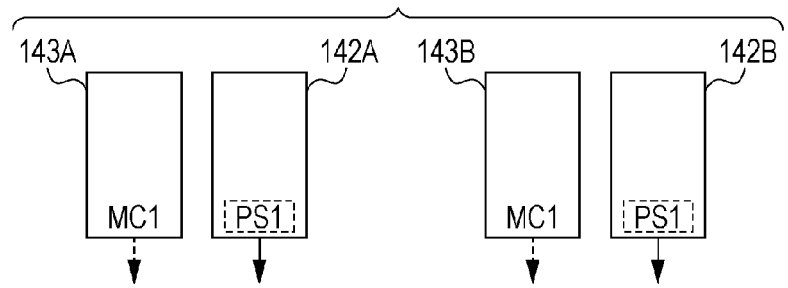
FIG. 9B is a schematic diagram illustrating processing in a queue according to the second embodiment.

Hereinafter, the command output processing in the second embodiment will be described with reference to FIG. 9B. In addition, FIG. 9B shows only the second queue 142 and the third queue 143 of the four queues 141 to 144.

For example, when the command MC1 is transmitted from the mechanical controller 43 to the controllers 41 and 42, at substantially the same time, the command PS1 is transmitted from the host control unit 125 to the controllers 41 and 42. At this time, the master-side controller 41 receives the command MC1, and thereafter receives the command PS1 with an extremely small delay. In this case, in the master-side job control portion 93, the command determination portion 140 determines the command types of the input commands, and assigns the commands to the queues corresponding to the command types. Hence, first the command MC1 is stored in the third queue 143A, and subsequently the command PS1 is stored in the second queue 142A (refer to the left side in FIG. 9B).

On the other hand, the slave-side controller 42 receives the host command PS1 at substantially the same time as the master side. However, the slave-side controller 42 receives the mechanical command MC1 with a delay caused by the communication performed through the communication line SL3 as compared with the master side. Hence, in the slave-side job control portion 93, first the command PS1 arrives, and thereafter the command MC1 arrives with a delay. In this case, the command determination portion 140 determines the command types of the input commands, and assigns the commands to the queues corresponding to the command types. Hence, first the command PS1 is stored in the second queue 142B, and subsequently the command MC1 is stored in the third queue 143B (refer to the right side in FIG. 9B).

Accordingly, even when the arrival sequence of the commands PS1 and MC1, which arrive at the job control portion 93, is different between the master side and the slave side, the command PS1 are stored in second queues 142A and 142B, and the command MC1 is stored in the third queues 143A and 143B.

Then, when a plurality of queues, in which the commands are stored, is present among the first to fourth queues 141 to 144, the command output portion 145 sequentially outputs the commands from the higher-priority queue thereof. Hence, in the example of FIG. 9B, first, the commands PS1 and PS1 are output from the second queues 142A and 142B with the second priority. In this case, since the commands PS1 and PS1 are synchronized, the virtual mechanical controller 85 confirms that the commands PS1 and PS1 coincide with each other, the command PS1 is transmitted from the master-side mechanical I/F unit 84 to the mechanical controller 43.

In the example of FIG. 9B, when the respective queues 142A and 142B become vacant by outputting the command PS1, next the command output portion 145 outputs the commands MC1 and MC1 from the highest-priority queues 143A and 143B of the queues in which the commands are stored. In this case, the virtual mechanical controller 85 confirms that the commands MC1 and MC1 coincide with each other, and then the command MC1 is transmitted from the master-side mechanical I/F unit 84 to the mechanical controller 43. Further, in some cases, the command MC1 may be sent to the head control unit 89, that is, the command may not pass through the mechanical I/F unit 84. In this case, first, the virtual mechanical controller 85 confirms that the commands PS1 and PS1, which are output from the second queues 142A and 142B, coincide with each other, and then the command PS1 is transmitted from the master-side mechanical I/F unit 84 to the mechanical controller 43. Subsequently, the command MC1 is sent to for example the head control unit 89 through the sequence control portion 94.

In the mechanical command MC, there is a type of a command that secondarily triggers another command in the controllers 41 and 42. In the embodiment, the secondary command, which is triggered by the mechanical command MC in the controllers 41 and 42, is also set to belong to the mechanical command MC (the first command). It is apparent that such a type of the secondary command may be set to belong to the internal command (the second command).

Examples of the types of the mechanical command MC, which triggers such a type of the secondary command, include a request command, which requests the controllers 41 and 42 to perform a prescribed operation, and the like. When completing the prescribed operation which is requested by the request command, the controller 41 issues the completion notification command to the mechanical controller 43. That is, in the controllers 41 and 42, the completion notification command is triggered by the request command. There is a concern about deviation in the timing of issuing such a type of the secondary command when the prescribed operation, which is requested by the request command, is asynchronously performed between the master and the slave. Between the deviated timings, if the host command PS1 is inserted, the sequence of the secondary command MC and the host command PS1, which are input to the job control portion 93, becomes different between the master and the slave.

Even in this case, in the embodiment, as shown in FIG. 9B, the host command PS1 is stored in the second queues 142A and 142B, and the mechanical command MC1 (including the secondary command) is stored in the third queues 143A and 143B. Accordingly, even in this case, first, the host commands PS1 and PS1 are output from the high-priority second queues 142A and 142B, the virtual mechanical controller 85 confirms that the commands PS1 and PS1 coincide with each other, and thus the command PS1 is transmitted to the mechanical controller 43. Subsequently, the commands MC1 and MC1 are output from the high-priority third queues 143A and 143B, the virtual mechanical controller 85 confirms that the commands MC1 and MC1 coincide with each other, and thus the command MC1 is transmitted to the mechanical controller 43. Alternately, the mechanical command MC is sent to other control units, such as the head control unit 89, in the controllers 41 and 42 through the sequence control portion 94.

Next, the command output processing will be described with reference to an example of a case where the request command is a cleaning request. The mechanical controller 43 counts the number of printed sheets and the opening time period of the cap 33 of the maintenance device 32. On the basis of the count value, it may be determined that it is necessary to clean the recording heads 29. In this case, a reject, which rejects the command of the printing preparation instruction issued from the controller 41, is returned, and thus a cleaning operation is voluntarily started. At this time, the mechanical controller 43 requests the controller 41 to perform a flushing operation which is an ink ejection operation (idle ejection) for cleaning as a cleaning operation. Here, the flushing operation is defined as a cleaning operation that obviates or solves the nozzle clogging by ejecting ink droplets from the nozzles of the recording heads 29 regardless of printing.

Further, when performing the flushing operation, the mechanical controller 43 drives the ejection driving element in a non-ejection driving range around the time of the flushing operation, and requests the controller 41 to perform a micro-vibration operation which performs micro-vibration on the ink within each nozzle. Here, the micro-vibration operation is performed in order to prevent viscosity of the ink from increasing by performing micro-vibration on the ink within the nozzle.

Specifically, when the cleaning operation is started, first the mechanical controller 43 moves the carriage 27 to the flushing position, and issues a flushing start request command (the mechanical command MC) to the controllers 41 and 42 when the carriage 27 reaches a prescribed position.

The controllers 41 and 42, which receives the flushing start request command, immediately returns the ACK signal. Since the flushing start request command belongs to the mechanical command MC, the command is stored in the third queue 143 when sent from the mechanical I/F unit 84 to the job control portion 93. The flushing start request command, which is output from the third queue 143, is sent to the head control unit 89 through the sequence control portion 94. The head control unit 89, which receives the flushing start request command, starts the flushing operation. That is, a voltage waveform, which is output to the recording head 29, is changed from an ejection waveform to a flushing waveform, and ejection data for flushing is generated and is transferred to the recording head 29, thereby starting the flushing operation.

In the flushing operation, it is not necessary to perform synchronization between the master and the slave, the operation is asynchronously performed. When the ejection is performed a predetermined number of times of shot and the flushing operation ends, the flushing completion notification command is sent from the head control unit 89 to the job control portion 93 through the sequence control portion 94.

The flushing completion notification command is a secondary command which is triggered by the mechanical command MC issued from the mechanical controller 43 and is generated in the controllers 41 and 42, and belongs to the mechanical command MC in this example. As a result, the flushing completion notification command is stored in the third queue 143. At this time, a time lag between the master and the slave may be caused by the condition of the time period of the flushing process. Hence, the times of issuing the flushing completion notification command are likely to be deviated between the master and the slave. When the host command PS1 is inserted therebetween, the sequence of the commands PS1 and MC1, which are input to the job control portion 93, is changed between the master and the slave.

However, in the embodiment, as shown in FIG. 9B, the host command PS1 is stored in the second queues 142A and 142B, and the mechanical command MC1 is stored in the third queues 143A and 143B. Hence, first, the host commands PS1 and PS1 are output from the respective second queues 142A and 142B. When the virtual mechanical controller 85 confirms that the commands PS1 and PS1 coincide with each other, the command PS1 is transmitted to the mechanical controller 43. Next, the mechanical commands MC1 and MC1 are output from the respective third queues 143A and 143B. When the virtual mechanical controller 85 confirms that the commands MC1 and MC1 coincide with each other, the command MC1 (the flushing completion notification command) is transmitted to the mechanical controller 43.

When receiving the flushing completion notification command, then the mechanical controller 43 issues a micro-vibration start request command (the mechanical command MC) to the controllers 41 and 42. The controllers 41 and 42, which receives the micro-vibration start request command, immediately returns the ACK signal. Since the micro-vibration start request command also belongs to the mechanical command MC, the timings of arrival of the command at the respective controllers 41 and 42 are deviated. When the host command PS is issued therebetween, the sequence of the commands PS and MC, which are input to the job control portion 93, becomes different between the master and the slave. Even in this case, as shown in FIG. 9B, the host command PS1 is stored in the second queues 142A and 142B, and the mechanical command MC1 (the micro-vibration start request command) is stored in the third queues 143A and 143B. Therefore, as described above, the host command PS1 is transmitted to the mechanical controller 43. Further, next, the micro-vibration start request commands, which are output from the third queues 143A and 143B, are sent to the head control unit 89, and the head control unit 89 starts the micro-vibration of the recording head 29.

On the other hand, the mechanical controller 43, which receives the flushing completion notification, drives the first CR motor 62 to move the carriage 27 from the flushing position to a capping position (for example a home position). Then, when the carriage 27 reaches the capping position, the mechanical controller 43 drives the elevating device 34 to move the cap 33 toward the capping position. The mechanical controller 43 issues the micro-vibration stop command (the mechanical command MC) to the controllers 41 and 42 immediately before the recording head 29 is capped by the cap 33. The controllers 41 and 42, which receive the micro-vibration stop command, immediately return the ACK signal, and stop the micro-vibration of the recording head 29. As a result, immediately before the recording head 29 is capped by the cap 33, the micro-vibration of the recording head 29 is stopped.

As another example of the mechanical command MC, there is a cover-close notification command which is issued from the mechanical controller 43 when the closed state of the cover 38 is detected. When the cover 38 is closed, the mechanical controller 43 issues the cover-close notification command (the mechanical command MC) to the controller 41. Since the cover-close notification command also belongs to the mechanical command MC, the timings of arrival of the commands at the respective controllers 41 and 42 are deviated. When the host command PS is inserted therebetween, the sequence of the commands PS and MC, which are input to the job control portion 93, becomes different between the master and the slave. In the embodiment, the host command PS is stored in the second queues 142A and 142B, and the mechanical command MC (the cover-close notification command) is stored in the third queues 143A and 143B. Even in this case, without causing the command transmission error, it is possible to transmit the host command PS1 to the mechanical controller 43.

Further, the cover-close notification command, which is output from the third queue 143, is sent to the ink management unit 90 through the sequence control portion 94. The ink management unit 90, which receives the cover-close notification command, accesses the storage element 47, and starts the cartridge detection process (an ink-related detection process). The cartridge detection process is asynchronously performed since it is not necessary to perform synchronization between the master and the slave. When the cartridge detection process ends, the detection-result notification commands are transmitted to the other controller through the communication between the communication I/F units 87 and 87. Thereafter, the respective controllers 41 and 42 merge the contents of the detection results of the respective detection-result notification commands, and issues, on the basis of the merging result, a package-state notification command for transferring presence or absence of errors such as running out of ink and mount misalignment of the cartridge IC to the mechanical controller 43. The issued package-state notification command is sent to the job control portion 93. The package-state notification command is a command of the detection system which notifies the result of the cartridge detection process started by the cover-close notification command (the mechanical command MC) as a trigger. Therefore, the command is set to belong to the internal command (the second command). It is apparent that the package-state notification command is set to belong to the mechanical command MC.

The condition of the process time period of the cartridge detection process causes a time lag between the master and the slave, and the times of issuing the package-state notification command are likely to be deviated between the master and the slave. When the host command PS1 is inserted therebetween, the sequence of the commands PS1 and ER1, which are input to the job control portion 93, is changed between the master and the slave. However, in the embodiment, as shown in FIG. 10, the internal command ER1 (the package-state notification command) is stored in the first queue 141, and the host command PS1 is stored in the second queue 142.

Then, first, the internal commands ER1 and ER1 are output from the respective first queues 141, and the determination portion 135 determines that the command is the internal command. Therefore, the master-side command ER1 and the slave-side command ER1 are respectively transmitted to the mechanical controller 43. Subsequently, the host commands PS1 and PS1 are output from the respective second queues 142A and 142B. When the virtual mechanical controller 85 confirms that the commands PS1 and PS1 coincide with each other, the command PS1 is transmitted to the mechanical controller 43. The mechanical controller 43, which receives the package-state notification command, starts ink supply by driving the pump motor 65 of the ink supply device 39 if the state is a normal package state, and does not start the ink supply if the state is an abnormal package state. In this example, the package-state notification command is doubly notified to the mechanical controller 43. However, just the command with the same contents is notified twice during a short period of time, and thus a problem in the operation does not arise. In addition, when the package-state notification command is set to belong to the mechanical command MC, as shown in FIG. 9B, the command is stored in each queue, and is performed similarly to the above-mentioned process. Therefore, it is possible to avoid the command transmission error which is caused by the situation in which it is difficult for the virtual mechanical controller 85 to confirm that the commands coincide with each other.

As described above, the sequences of the host command PS and the mechanical command MC, which arrive at the controllers 41 and 42, may become different, and the sequences of the secondary command MC and the host command PS, which are triggered by the mechanical command MC and are issued from the controllers 41 and 42, may become different. Even in this case, the respective commands PS and MC are separately stored in the respective corresponding queues 142 and 143. Hence, with the configuration of the first embodiment, it is possible to avoid a possible situation in which the sequences of the commands are changed in the same queue. Accordingly, although the sequence of receiving the commands PS and MC are different between the controllers 41 and 42, it is possible to avoid occurrence of the command transmission error.

Figure 11A:
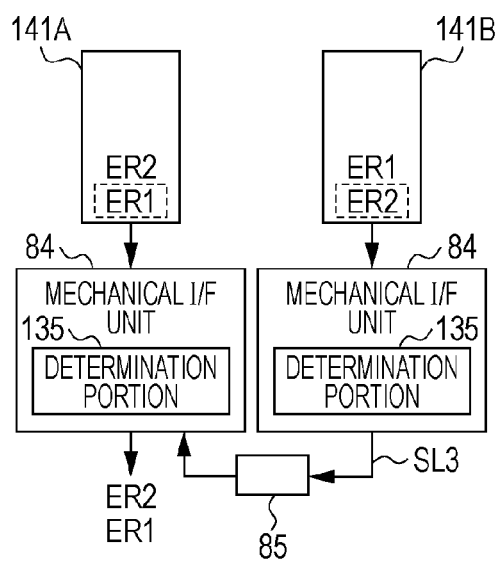
FIGS. 11A and 11B are schematic diagrams illustrating processing in a first queue according to the second embodiment.
Figure 11B:
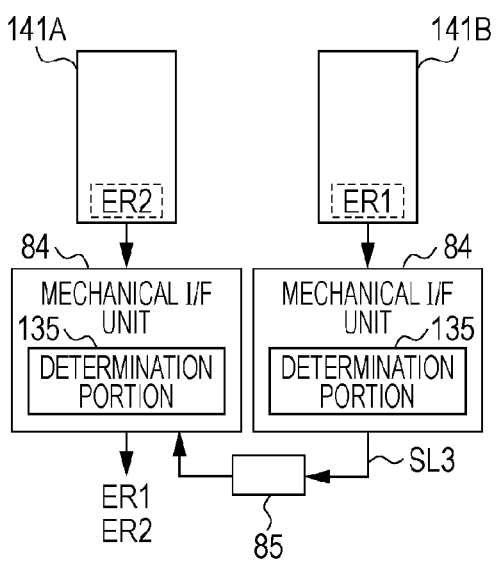

FIGS. 11A and 11B are schematic diagrams illustrating the command output processing when the sequence of the error commands is changed. Furthermore, FIGS. 11A and 11B schematically show only the first queues, the mechanical I/F units, and the virtual mechanical controllers, in which some elements such as the mechanical control unit and the second to fourth queues are omitted. For example, as shown in FIG. 11A, a description will be given of the command output processing in the case where the sequence of the error commands is changed.

For example, the error command ER1 is generated in the master-side controller 41, and at substantially the same time, the error command ER1 is generated in the slave-side controller 42. In this case, the error command ER1 is transmitted from the master-side controller 41 to the host side through the communication line SL4. At substantially the same time, the error command ER2 is transmitted from the slave-side controller 42 to the slave side through the communication line SL4. Hence, the command, which is internally generated, is stored first, and the command, which arrives with a delay through the communication line SL4, is stored later.

Hence, in first queue 141A on the master side, the error commands are stored in the sequence of the error commands ER1 and ER2, and in the first queue 141B on the slave side, the error commands are stored in the sequence of the error commands ER2 and ER1. From this state, the error commands ER1 and ER2, which are disposed at the most downstream storage positions of the respective queues 141A and 141B of FIG. 11A. The mechanical I/F unit 84 receives the output error commands ER1 and ER2.

In the mechanical I/F unit 84, the determination portion 135 determines whether or not the received commands are the internal commands. In this case, since it is determined that the error command ER1 is the internal command, the master-side mechanical I/F unit 84 transmits the command ER1 to the mechanical controller 43 without performing a query on the virtual mechanical controller 85. Further, also in the slave-side mechanical I/F unit 84, the determination portion 135 determines that the error command ER2 is the internal command, and thus the error command ER2 is output from the slave-side mechanical I/F unit 84 through the communication line SL3. Then, the virtual mechanical controller 85, which receives the error command ER2 through the communication line SL3, confirms that the command received from the slave-side mechanical I/F unit 84 is the internal command, and thus transmits the command to the master-side mechanical I/F unit 84. The mechanical I/F unit 84 transmits the command, which is determined as the internal command by the determination portion 135, or the command, which is received from the virtual mechanical controller 85, to the mechanical controller 43. Accordingly, also in the second embodiment, even when the sequence of the internal commands such as the error command stored in the first queue 141 is different between the master side and the slave side, the mechanical I/F unit 84 passes the error command to the mechanical controller 43 without performing a query on the virtual mechanical controller 85, whereby it is possible to avoid occurrence of the command transmission error.

As described above in detail, according to the second embodiment, the following effects can be obtained.

(7) There are separately provided the second queue 142, in which the host command PS issued from the host control unit 125 is stored, and the third queue 143 in which the mechanical command MC issued from the mechanical controller 43 is stored. Therefore, even when the order of acquisition of the host command PS and the mechanical command MC is changed between the controllers 41 and 42, it is possible to separately store the commands into the respective queues corresponding thereto. Accordingly, it is possible to avoid the command transmission error which is likely to be caused by the factor that the sequence of receiving the host command PS and the mechanical command MC is different between the controllers 41 and 42 in the case of the configuration of the first embodiment. Further, the command (for example, the completion notification command), which is triggered by the mechanical command MC (for example, the request command) and is generated in the controllers 41 and 42, is also set to belong to the mechanical command MC. Thereby, the configuration is made such that the command is stored in the third queue 143 different from the second queue 142 for the host command. Accordingly, even when the sequence of such types of the mechanical command MC and the host command PS which are input to the job control portion 93 is different between the master and the slave, it is possible to avoid occurrence of the command transmission error.

(8) Since priorities are set to the respective queues 141 to 143, it is possible to output the commands from the corresponding queues between the respective controllers 41 and 42. Hence, it is possible to sort the commands which are output from the mechanical control unit 83 to the mechanical I/F unit 84 in the respective controllers 41 and 42.

(9) The sequence of the internal commands such as the error command stored in the first queue 141 may be different between the controllers 41 and 42. Even in this case, if the determination portion 135 of the mechanical I/F unit 84 determines that the command is the internal command, the internal command is output to the mechanical controller 43 without performing a query on the virtual mechanical controller 85. Accordingly, also in the second embodiment, it is possible to avoid the command transmission error which is caused by the factor that the error commands are not synchronized by the virtual mechanical controller 85.

In addition, the above-mentioned embodiments may be modified into the following forms.

In the embodiments, it may be possible to adopt a configuration in which the internal command is not notified through the communication I/F unit 87. In this case, the internal command is not stored in the queue 133B of the controller in which the internal command is not generated, and thus the double notification of the error command to the mechanical controller 43 is not performed.

In the embodiments, the determination portion 135 determines whether or not the command is the "internal command", but may determine whether or not the command is a "through-command" which should be passed to the mechanical controller 43 as it is without undergoing the synchronization processing in advance. In this case, in order to determine whether or not the command is the through-command, an identifier for through-command may be assigned to the command, or a flag to the effect that the command is the through-command may be set in a packet. For example, the following commands may be set as the through-commands: the error command that is generated in the controllers 41 and 42; the internal command other than the error command; and the error command that is issued by the host device 120. In this configuration, also at least the internal command is passed without undergoing the synchronization processing.

In the second embodiment, the priorities, which are set to the first to third queues 141 to 143, may be appropriately changed. For example, the queue for storing the host command PS may be set to the first priority, the queue for storing the mechanical command MC may be set to the second priority, and the queue for storing the internal command may be set to the third priority. Since the command stored in any queue thereof is the emergency command, particularly, the priority thereof may be appropriately set.

In the second embodiment, the queue (the first queue 141) for the internal command may be removed. For example, the internal command may be stored in the second queue for the host command or the third queue for the mechanical command. In this case, in the combination of the commands which are output from the mechanical control units 83 of the respective controllers 41 and 42 to the mechanical I/F units 84, in the combination of the internal command and the host command, or in the combination of internal command and the mechanical command, the internal command in the combination is transmitted, on the basis of the determination result obtained by the determination portion 135, to the mechanical controller 43 without undergoing the synchronization processing. Accordingly, the host commands or the mechanical commands are synchronized by the subsequent retrial, and thus the command transmission error is avoided.

In the second embodiment, it may be possible to adopt a configuration in which priorities are not set to the plurality of queues where the first commands (the internal command, the host command PS, and the mechanical command MC) are stored. When the commands are output form the corresponding queues among the plurality of controllers, the commands are synchronized in the virtual mechanical controller 85, and thus it is possible to avoid the command transmission error. For example, it may be possible to adopt a configuration in which, when one command is output from one queue of the first to third queues, circulation of shifting the command output queue to the subsequent queue is repeated until there is no command.

The synchronization section is not limited to the method using the virtual mechanical controller 85. For example, it may be possible to adopt the following configuration. As an output portion of the plurality of printing control devices, there may be provided a synchronization circuit which is interposed between the mechanical controller 43 and the printing control devices. Thereby, when the commands transmitted from the plurality of printing control devices are synchronized in the synchronization circuit and all the commands coincide with each other, the commands are transmitted to the mechanical controller 43.

The synchronization section may be configured such that the commands are not received from the respective output section of the plurality of printing control devices but information for determination as to whether or not the commands coincide with each other when the commands are received is received instead of the commands. As information, there is command identifier information (for example, a command number).

The internal command is not limited to the error command. The command may be an internal command which is individually generated in the controller as an example of the printing control device. If the command is the internal command, when the command is transmitted to another controller through the communication line SL4, it takes a relatively long time to perform communication of the internal command. For this reason, the order of acquisition of the commands is different between job control portions 93 of the respective controllers of a transmission source and a transmission destination. In such a configuration, the same problem arises.

In the second embodiment, the secondary command, which is triggered by the mechanical command MC and is generated in the controllers 41 and 42, may be treated as the internal command (the second command). There is no problem in treating such a type of command, which does not cause any problem if the completion notification command is doubly notified from each of the controllers 41 and 42, as the internal command. In configuration, also the internal command is not passed through the virtual mechanical controller 85, and thus it is possible to avoid the transmission error of the host command PS.

The detection section is not limited to the ink management unit 90 which detects the ink cartridge state (mounting misalignment, wrong color, running out of ink, and the like) as an example of the component. By providing a nozzle testing section for detecting nozzle clogging for each recording head 29, a plurality of nozzle testing sections as an example of components is shared among and is connected to the plurality of controllers 41 and 42. In addition, it may be possible to adopt a configuration in which each controller includes a test control unit (the detection section) which has a function of controlling the test of the nozzle testing section and a detection function of detecting nozzle clogging (nozzle error) on the basis of the nozzle test result of the nozzle testing section. In this case, the command based on the nozzle test result or the detection result is notified to another controller through the communication I/F units 87 and 87 between the controllers 41 and 42. In addition, the respective test control units, which are provided in the respective controllers 41 and 42, generates a nozzle clogging error command (a nozzle error command) on the basis of the nozzle test result, or generates a cleaning command for causing the maintenance device 32 to perform cleaning on the basis of the nozzle test result. In this case, since it takes a relatively long time to perform communication, the sequences (that is, the sequences of commands stored in the queues 133B) of commands acquired by both master-side and slave-side controllers 41 and 42 may be different. Even in this case, it is possible to output the nozzle error command and the cleaning command to the mechanical controller 43 without causing the command transmission error.

The printing section, which is shared and controlled by the controllers 41 and 42, as an example of the printing control device is not limited to the recording head 29. The printing section may be applied to, for example, a carriage driving system including a carriage motor, and may also be applied to a transport driving system including a transport motor. Moreover, the printing section may be constituted by adding the carriage driving system or the transport driving system to the recording head 29. Further, the carriage driving system and the transport driving system may constitute the printing section.

The number of printing control devices is not limited to two, but it may be possible to adopt a configuration in which three or more printing control devices are connected.

The number of recording heads may be one. For example, in a line-recording-type long recording head, it may be possible to adopt the following configuration: a plurality of head areas, by which all the nozzles are partitioned, is shared among and controlled by a plurality of, that is, two or more printing control devices, and the printing control devices are synchronized to output commands to the mechanical controller.

In FIG. 4, the respective function sections of the controller is mainly embodied as software by causing the CPU to execute programs. However, the sections may be embodied as hardware, or may be embodied as a combination of software and hardware.

The printing apparatus is not limited to the lateral-type printer 11, but may be a serial printer, a line printer, or a page printer. Furthermore, the apparatus is not limited to the ink jet type, but a dot-impact-type printing apparatus may be employed.

In the embodiment, as the printing apparatus, the ink jet printer 11 is employed, but a fluid ejection apparatus, which ejects or discharge fluid other than ink, may be employed. Further, the embodiment may be applied to use various kinds of liquid ejection apparatuses each having a liquid ejection head, which discharges a minutely small amount of liquid droplets, and the like. In this case, the liquid droplets mean a state of liquid discharged from the liquid ejection apparatus, and are defined to include droplets having a granular shape, a tear shape, and a thread shape as a trailing shape. Further, the liquid described herein may be any material as long as the material is able to be ejected by the liquid ejecting apparatus. For example, any material in a liquid state may be used, and the material may include not only liquid, which is one state of substance, such as liquid substance having high or low viscosity, sol, gel water, other inorganic solvents, organic solvents, solution, fluid like resin, and fluid like liquid metal (metallic melt), but also a material in which particles of a functional material formed of solids such as pigments and metallic particles are dissolved, distributed, or mixed in a solvent. Further, representative examples of the liquid include the ink as described in the embodiment and a liquid crystal. Here, the ink is defined to include various liquid composites such as general water-based and oil-based inks, gel ink, and hot-melt ink. The detailed examples of the liquid ejecting apparatus include a liquid ejecting apparatus for ejecting liquids including materials, in a distributed or dissolved form, such as color materials and electrode materials used for production of a liquid crystal display, an EL (electroluminescence) display, a surface-emitting display, and a color filter. Further, the examples also include: a liquid ejecting apparatus for ejecting bio organic materials used in bio chip production; a liquid ejecting apparatus, which is used as a precision pipette, for ejecting liquids as specimens; a textile printing apparatus; and a micro dispenser. Moreover, it may be possible to employ a liquid ejecting apparatus for ejecting lubricating oil to precision instruments such as a clock and a camera by using a pin point method; a liquid ejecting apparatus for ejecting transparent resin liquid such as ultraviolet curable resin on a substrate in order to form a micro hemispherical lens (an optical lens) used in an optical communication element; and a liquid ejecting apparatus for ejecting etching liquid such as acid or alkali in order to perform etching on a substrate and the like. In addition, the embodiment of the invention can be applied to any one of the liquid ejection apparatuses mentioned above. Further, the fluid may be a powder-particle material such as toner. In addition, the fluid described in the specification does not include a material formed of only gas.

The technical idea, which can be obtained from the embodiments and the modified examples, will be described below.

A printing control system includes: one printing control device that has the synchronization section according to any one of the embodiments; and the other printing control device that does not have the synchronization section. The output section of the other printing control device is connected to the synchronization section, and the output section of the one printing control device is connected to the synchronization section and the driving control section. With such a configuration, the printing section can be shared among and controlled by a plurality of printing control units. Moreover, it is possible to avoid errors of the synchronization section caused by the commands in the respective output sections not being entirely synchronized with each other.

What is claimed is:

1. A printing control device used in a printing apparatus including a plurality of the printing control devices that share and perform control of a printing section and a driving control section that controls driving of a printing mechanical mechanism based on commands issued from the plurality of printing control devices, the printing control device comprising:
    an input section that inputs a first command;
    a command generation section that generates a second command from inside the printing control device;
    a management section that manages the first and second commands in an acquired order;
    an instruction section that outputs the first and second commands in a managed order;
    an output section that outputs the first and second commands, which are received from the instruction section, to the driving control section; and
    a synchronization section that synchronizes the commands in output from the respective output sections of the plurality of printing control devices and then outputs corresponding commands to the respective output sections,
    wherein, in outputting the first and second commands to the driving control section, the output section determines whether the command received from the instruction section is the first command or the second command, and if the command is the first command, the output section performs synchronization using the synchronization section and subsequently outputs the first command, whereas if the command is the second command, the output section does not perform synchronization using synchronization section and outputs the second command.

2. The printing control device according to claim 1, further comprising a communication section that communicates with a different printing control device,
    wherein the printing control device transmits the second command to the different printing control device through the communication section.

3. A printing apparatus comprising:
    a plurality of the printing control devices that share and perform control of a printing section based print data; and
    a driving control section that controls driving of a printing mechanical mechanism based on commands issued from the plurality of printing control devices,
    wherein the plurality of printing control devices is are the printing control device according to claim 2.

4. The printing control device according to claim 1,
    wherein a plurality of components provided in the printing apparatus are shared among and connected to the plurality of printing control devices,
    wherein the printing control device further comprises a detection section that detects states of the plurality of components which are shared, and
    wherein the command generation section generates the second command based on a detection result of the detection section.

5. The printing control device according to claim 4, wherein the second command is an error command which is generated by the command generation section when the detection section detects an error.

6. A printing apparatus comprising:
    a plurality of the printing control devices that share and perform control of a printing section based on print data; and a driving control section that controls driving of a printing mechanical mechanism based on commands issued from the plurality of printing control devices, wherein the plurality of printing control devices is are the printing control device according to claim 5.

7. A printing apparatus comprising:

a plurality of the printing control devices that share and perform control of a printing section based on print data; and a driving control section that controls driving of a printing mechanical mechanism based on commands issued from plurality of the printing control devices, wherein the plurality of printing control devices is are the printing control device according to claim 4.

8. The printing control device according to claim 1, wherein each of the plurality of printing control devices are connected to a host control section, which generates print data, through the input section, and one of the plurality of printing control devices is connected to the driving control section through the input section, wherein the first command issued from the driving control section is transmitted to a different printing control device through the one printing control device, and wherein the management section has a first management section, which manages the first command acquired from the host control section through the input section in order of acquisition, and a second management section which manages the first command acquired from the driving control section in order of acquisition.

9. The printing control device according to claim 8, wherein priorities are set for the first management section and the second management section, and wherein the first management section has an output portion that outputs the commands in order from a higher set priority one of the first management section and the second management section.

10. A printing apparatus comprising:

a plurality of the printing control devices that share and perform control of a printing section based on print data; and a driving control section that controls driving of a printing mechanical mechanism based on commands issued from the plurality of printing control devices, wherein the plurality of printing control devices is are the printing control device according to claim 9.

11. A printing apparatus comprising:

a plurality of the printing control devices that share and perform control of a printing section based on print data; and a driving control section that controls driving of a printing mechanical mechanism based on commands issued from the plurality of printing control devices, wherein the plurality of printing control devices is are the printing control device according to claim 8.

12. A printing apparatus comprising:

a plurality of printing control devices that share and perform control of a printing section based on print data; and a driving control section that controls driving of a printing mechanical mechanism based on commands issued from the plurality of the printing control devices, wherein the plurality of printing control devices is are the printing control device according to claim 1.

13. A printing control method used in a printing apparatus including a plurality of printing control devices that share and perform control of a printing section and a driving control section that controls driving of a printing mechanical mechanism based on the basis of commands issued from the plurality of printing control devices, the printing control method comprising:

inputting a first command;

generating a second command from inside of one the plurality of printing control devices;

managing the first and second commands in an acquired order; and outputting the first and second commands in the a managed order;

determining whether the outputted command received in the outputting of the first and second commands is the first command or the second command, and, if the command is the first command, synchronizing the commands in the respective output sections of the respective printing control devices of the plurality of printing control devices through a synchronization section and outputting the first command to the driving control section, but whereas if the command is the second command, not performing synchronization through the synchronization section is not performed, and outputting the second command is outputted to the driving control section.

* * * * *